(12) United States Patent
Lee et al.

(10) Patent No.: US 12,532,074 B2
(45) Date of Patent: Jan. 20, 2026

(54) ACTUATOR FOR OPTICAL IMAGING STABILIZATION AND CAMERA MODULE INCLUDING THE SAME

(71) Applicant: SAMSUNG ELECTRO-MECHANICS CO., LTD., Suwon-si (KR)

(72) Inventors: Kyung Hun Lee, Suwon-si (KR); Jong Woo Hong, Suwon-si (KR); Jong Ho Lee, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 380 days.

(21) Appl. No.: 18/186,372

(22) Filed: Mar. 20, 2023

(65) Prior Publication Data

US 2024/0080561 A1    Mar. 7, 2024

(30) Foreign Application Priority Data

Sep. 5, 2022    (KR) .................. 10-2022-0112262

(51) Int. Cl.
*G02B 27/64* (2006.01)
*G03B 5/00* (2021.01)
(Continued)

(52) U.S. Cl.
CPC ............. *H04N 23/687* (2023.01); *G03B 5/00* (2013.01); *H02K 41/0356* (2013.01);
(Continued)

(58) Field of Classification Search
CPC ...... H04N 23/687; H04N 23/54; H04N 23/55; H04N 23/57; H04N 23/50; G03B 5/00;
(Continued)

(56) References Cited

U.S. PATENT DOCUMENTS

| 11,057,564 B2 | 7/2021 | Johnson et al. |
| 2021/0258491 A1* | 8/2021 | Park .................. G03B 13/36 |

(Continued)

FOREIGN PATENT DOCUMENTS

| JP | 5327478 B2 | 10/2013 |
| KR | 10-2011-0010016 A | 1/2011 |

(Continued)

OTHER PUBLICATIONS

Korean Office Action issued on Apr. 15, 2024, in counterpart Korean Patent Application No. 10-2022-0112262 (8 pages in English, 6 pages in Korean).

*Primary Examiner* — Euncha P Cherry
(74) *Attorney, Agent, or Firm* — NSIP Law

(57) ABSTRACT

An actuator includes a fixed frame, a movable frame accommodated in the fixed frame and moving linearly and rotationally on a plane perpendicular to an optical axis, a driving unit disposed in the fixed frame and the movable frame to provide driving force for moving the movable frame; a sensor substrate including a movable portion coupled to the movable frame to move together with the movable frame, and a fixed portion coupled to the fixed frame; and an image sensor disposed on the sensor substrate. The movable frame includes a reinforcing plate made of a material different from a material of the movable frame, and the reinforcing plate includes a bent portion bent toward the sensor substrate.

16 Claims, 18 Drawing Sheets

(51) Int. Cl.
  *H02K 41/035*  (2006.01)
  *H04N 23/54*  (2023.01)
  *H04N 23/68*  (2023.01)
(52) U.S. Cl.
  CPC ..... *H04N 23/54* (2023.01); *G03B 2205/0007* (2013.01); *G03B 2205/0069* (2013.01)
(58) Field of Classification Search
  CPC .... G03B 2205/0007; G03B 2205/0069; H02K 41/0356
  See application file for complete search history.

(56) References Cited

U.S. PATENT DOCUMENTS

| | | | |
|---|---|---|---|
| 2021/0325627 | A1 | 10/2021 | Ding et al. |
| 2022/0191359 | A1 | 6/2022 | Oh |
| 2022/0286543 | A1* | 9/2022 | Hale ................ H04M 1/0249 |
| 2023/0023813 | A1* | 1/2023 | Oh ..................... G03B 13/36 |

FOREIGN PATENT DOCUMENTS

| | | |
|---|---|---|
| KR | 10-2019-0019729 A | 2/2019 |
| KR | 10-2019-0106145 A | 9/2019 |
| KR | 10-2020-0114251 A | 10/2020 |
| KR | 10-2021-0081556 A | 7/2021 |
| KR | 10-2022-0074675 A | 6/2022 |

* cited by examiner

III-III'

ACTUATOR FOR OPTICAL IMAGING STABILIZATION AND CAMERA MODULE INCLUDING THE SAME

CROSS-REFERENCE TO RELATED APPLICATION

This application claims the benefit under 35 USC 119(a) of Korean Patent Application No. 10-2022-0112262 filed on Sep. 5, 2022 in the Korean Intellectual Property Office, the entire disclosure of which is incorporated herein by reference for all purposes.

BACKGROUND

Field

The following description relates to an actuator for optical imaging stabilization (OIS) and a camera module including the same.

Description of the Background

Camera modules have been adopted in portable electronic devices, such as smartphones, tablet PCs, and laptops, and camera modules include an actuator having a focus adjustment function and an OIS function to generate a high-resolution image.

For example, camera modules correct focus by moving a lens module in a direction of an optical axis, and perform OIS by moving the lens module in a direction perpendicular to the optical axis.

As performance of camera modules has improved, a weight of lens modules has also increased, but the increase in the weight of lens modules interferes with precise control of driving force for OIS.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, an actuator for optical imaging stabilization (OIS) includes: a fixed frame; a movable frame accommodated in the fixed frame and configured to move linearly and rotationally on a plane perpendicular to an optical axis; a driving unit disposed in the fixed frame and the movable frame configured to provide driving force for moving the movable frame; a sensor substrate including a movable portion coupled to the movable frame and configured to move together with the movable frame, and a fixed portion coupled to the fixed frame; and an image sensor disposed on the sensor substrate. The movable frame includes a reinforcing plate made of a material different from a material of the movable frame, and the reinforcing plate includes a bent portion bent toward the sensor substrate.

The movable frame may include a protrusion protruding toward the sensor substrate on a lower surface thereof, and the bent portion may be disposed on the protrusion.

The movable portion of the sensor substrate may be coupled to the protrusion of the movable frame.

An air gap may be formed in an optical axis direction between the movable frame and the sensor substrate.

The driving unit may include: a magnet disposed on the movable frame; and a coil disposed on the fixed frame. A ball member configured to guide movement of the movable frame may be disposed between the movable frame and the fixed frame.

The movable frame may include a plurality of recesses exposing the reinforcing plate in the optical axis direction.

The reinforcing plate may include: a first region exposed through a recess and in which the magnet is disposed; and a second region exposed through the recess and in which the ball member is disposed.

The first region may be disposed outside the second region on a plane perpendicular to the optical axis, and the bent portion may be disposed between the first region and the second region.

The reinforcing plate may include a material having higher thermal conductivity than a material of the movable frame.

The reinforcing plate may include a material having higher rigidity than a material of the movable frame.

The reinforcing plate may be integrally formed with the movable frame through insert injection.

The movable frame may be made of plastic, and the reinforcing plate may be made of stainless steel.

In another general aspect, an actuator for optical imaging stabilization (OIS) includes a fixed frame; a movable frame disposed to face the fixed frame in an optical axis direction and including a main body and a reinforcing plate comprised of a material different from a material of the main body; a sensor substrate disposed to face the movable frame in the optical axis direction; and an image sensor disposed on the sensor substrate. The movable frame includes a first portion coupled to the sensor substrate in the optical axis direction and a second portion spaced apart from the sensor substrate in the optical axis direction, and a bent portion extending from the reinforcing plate is disposed in the first portion of the movable frame.

An air gap may be formed in the second portion of the movable frame, and with respect to the bent portion, the image sensor may be disposed on a first side and the air gap may be formed on a second side.

The reinforcing plate may be made of stainless steel.

A camera module may include the actuator for OIS.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depictions of elements in the drawings may be exaggerated for clarity, illustration, and convenience.

DETAILED DESCRIPTION

Figure 1:
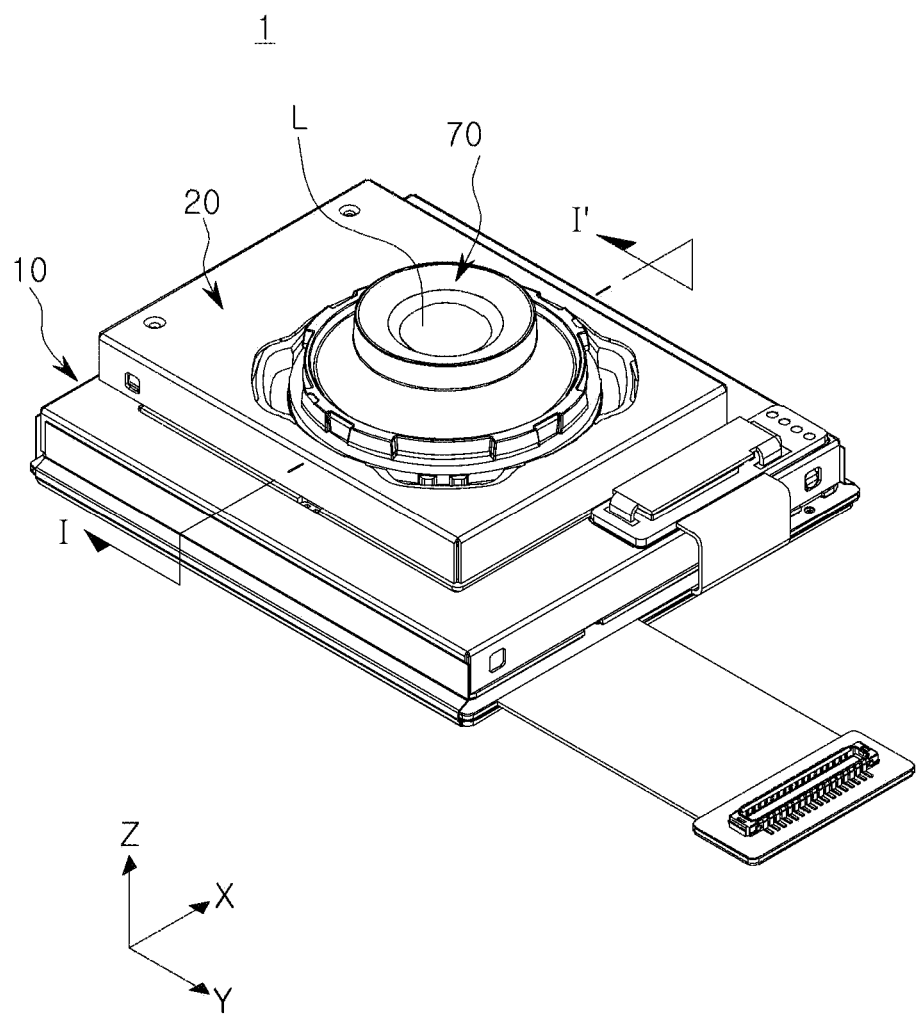
FIG. 1 is a perspective view of a camera module according to an example.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that would be well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will fully convey the scope of the disclosure to one of ordinary skill in the art.

Herein, it is noted that use of the term "may" with respect to an example or embodiment, e.g., as to what an example or embodiment may include or implement, means that at least one example or embodiment exists in which such a feature is included or implemented while all examples and embodiments are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

The drawings may not be to scale, and the relative sizes, proportions, and depiction of elements in the drawings may be exaggerated for clarity, illustration, and convenience.

Various examples will now be described in detail with reference to the accompanying drawings.

An actuator for optical imaging stabilization (OIS) and a camera module including the same according to various examples may be mounted on a portable electronic device. For example, mobile communication terminals, smartphones, tablet PCs, and the like may be portable electronic devices.

Figure 2:
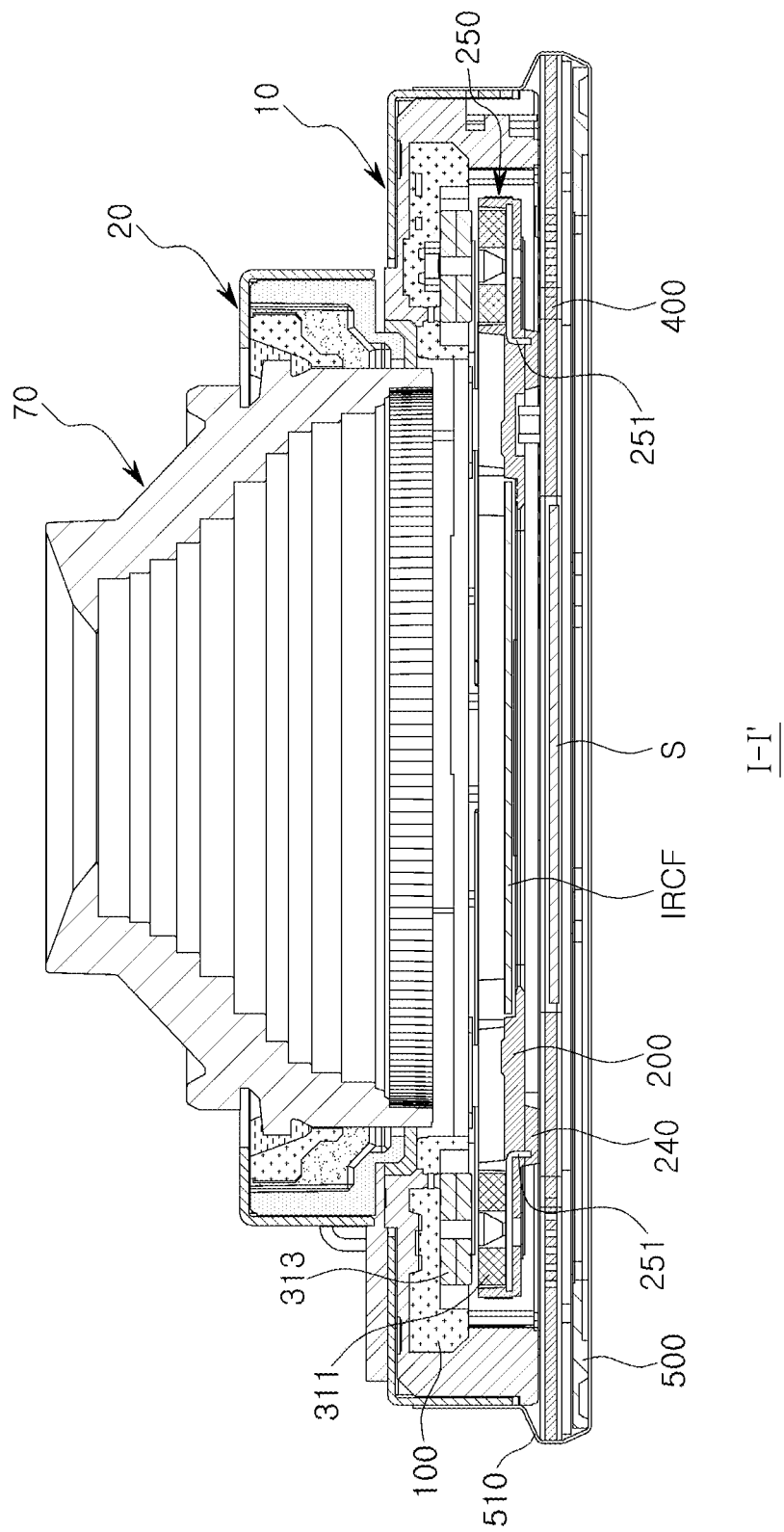
FIG. 2 is a cross-sectional view taken along line I-I' of FIG. 1.
Figure 3:
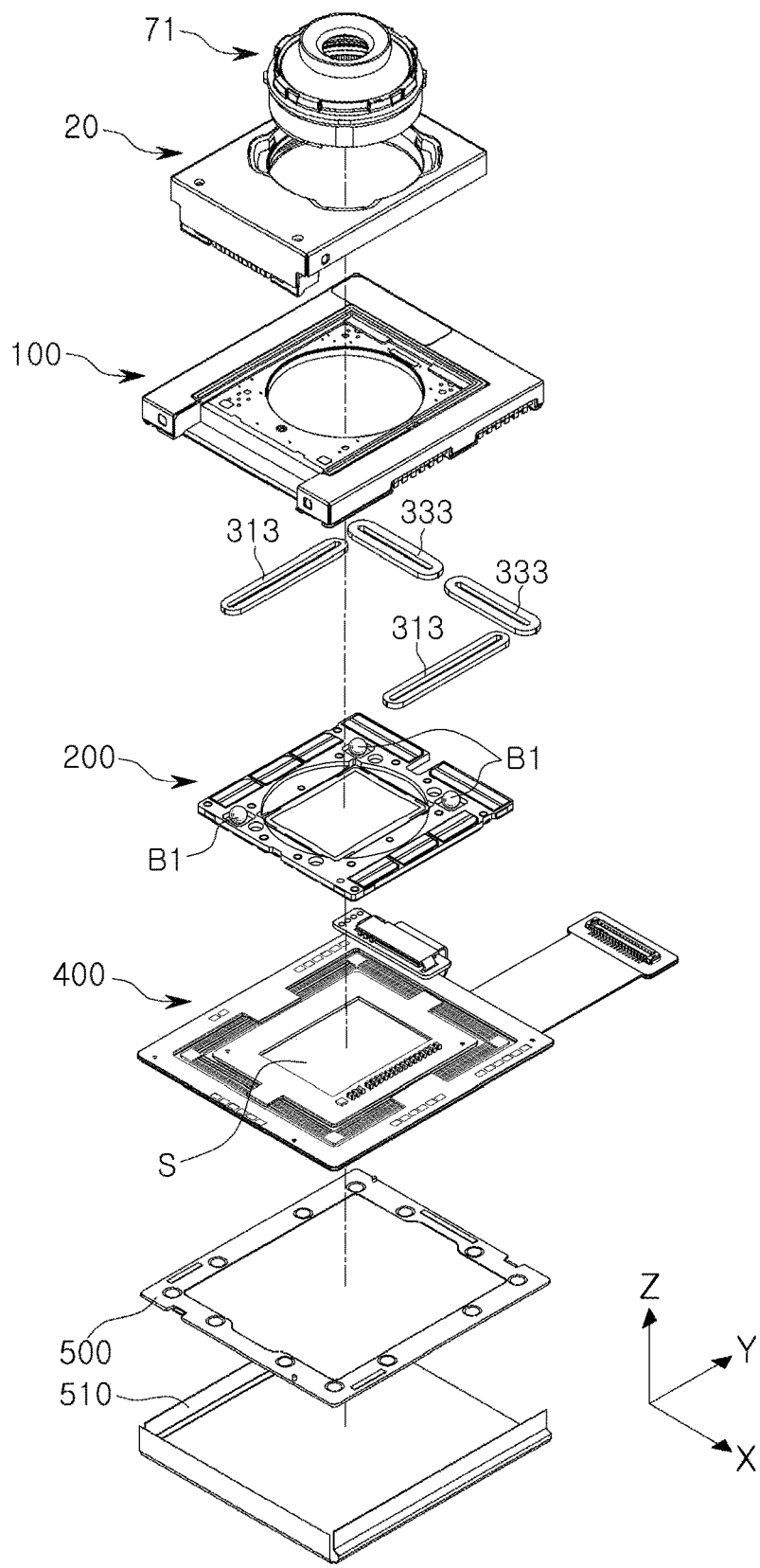
FIG. 3 is a schematic exploded perspective view of a camera module according to an example.

FIG. 1 is a perspective view of a camera module according to an example, FIG. 2 is a cross-sectional view taken along line I-I' in FIG. 1, and FIG. 3 is a schematic exploded perspective view of a camera module according to an example.

Referring to FIGS. 1 to 3, a camera module 1 may include a lens module 70, an image sensor S, a first actuator 10, and a second actuator 20.

The first actuator 10 may be an actuator for optical imaging stabilization (OIS), and the second actuator 20 may be a focus adjustment actuator.

The first actuator 10 may be configured to move an image sensor S in a direction perpendicular to an optical axis, and the second actuator 20 may be configured to move the lens module 70 in the optical axis direction. A detailed description thereof will be provided later.

The lens module 70 may include at least one lens L, a lens barrel 71, and a carrier 73.

At least one lens L may be mounted inside the lens barrel 71. At least one lens L may be mounted inside the lens barrel 71 along an optical axis (a Z-axis).

The lens barrel 71 may be disposed on the carrier 73. For example, the carrier 73 may include a hollow portion passing through the carrier 73 in the optical axis (the Z-axis) direction, and the lens barrel 71 may be inserted into the hollow portion. The lens barrel 71 may be fixed to the carrier 73.

The lens module 70 may be a movable member moving in the optical axis (the Z-axis) direction during focus adjustment and may be a fixed member not moving during OIS.

The camera module 1 may perform OIS by moving the image sensor S, instead of the lens module 70, in a direction perpendicular to the optical axis (the Z-axis).

That is, since the camera module 1 is configured to move the relatively light image sensor S using a smaller driving force during OIS, precise OIS may be performed.

As described above, OIS may be performed by the first actuator 10.

The first actuator 10 may perform OIS by moving the image sensor S on a plane (the X-Y plane) perpendicular to the optical axis (the Z-axis). In detail, the first actuator 10 may perform OIS by moving the image sensor S in the direction of a first axis (an X-axis) and a second axis (a Y-axis) perpendicular to the optical axis (the Z-axis) or rotating the image sensor S based on the optical axis (the Z-axis) as a rotation axis.

As an example, it is described that the image sensor S is rotated about the optical axis (the Z-axis) as a rotation axis for convenience, but the rotation axis of the image sensor S may not match the optical axis (the Z-axis). For example, the image sensor S may be rotated about an axis perpendicular to a direction in which an imaging surface of the image sensor S faces as a rotation axis.

Figure 4:
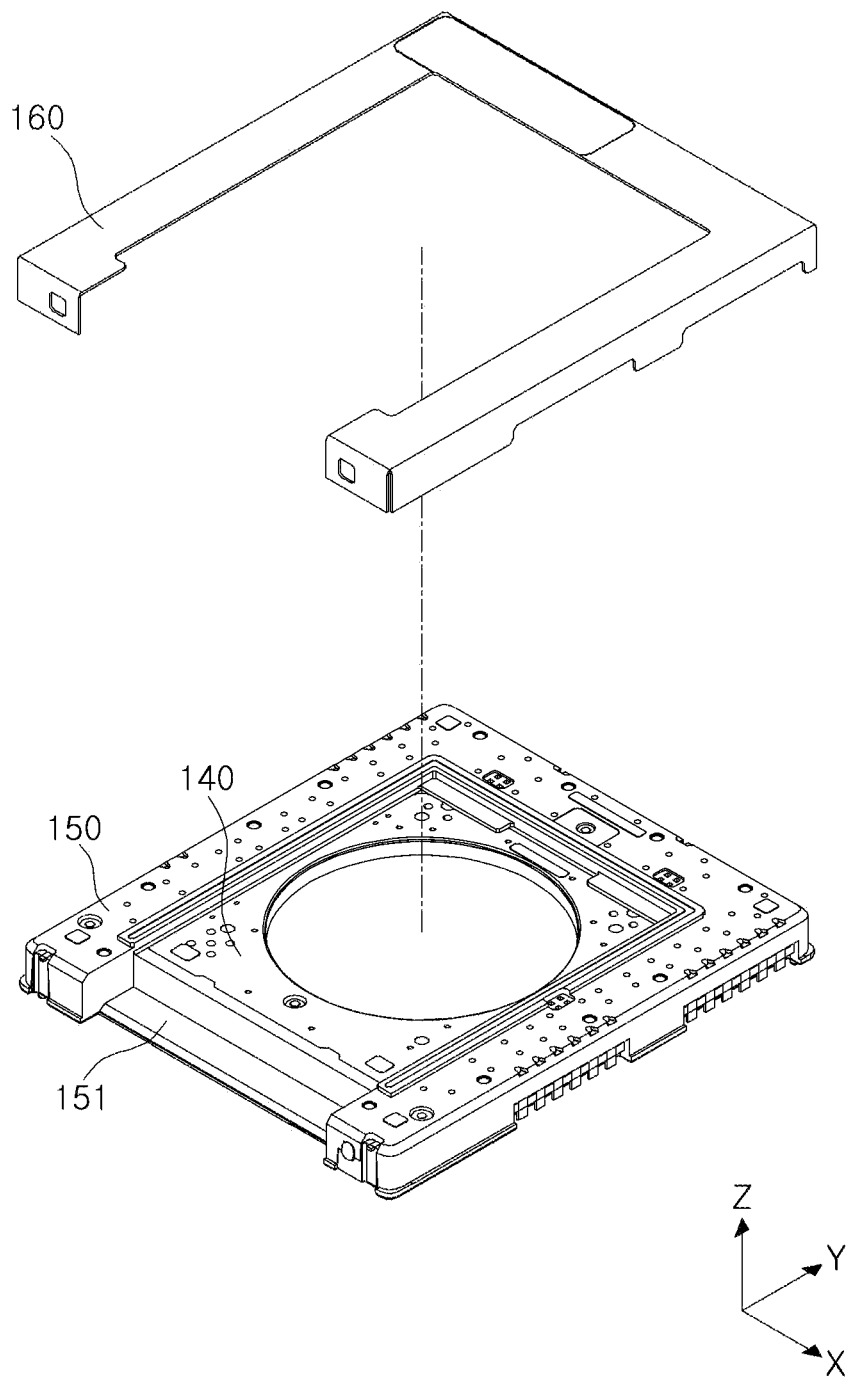
FIG. 4 is a perspective view of a fixed frame of a first actuator according to an example.
Figure 5:
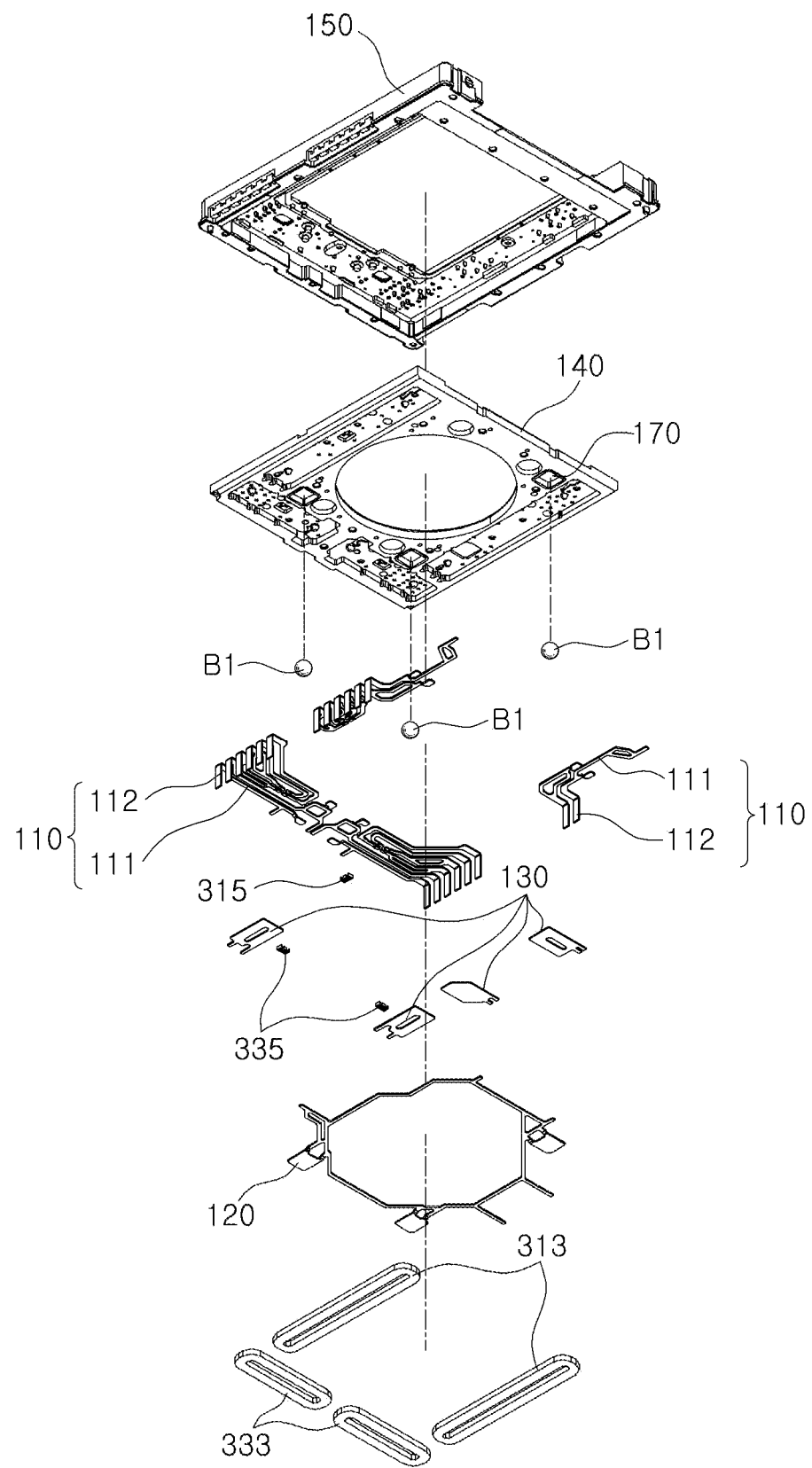
FIG. 5 is an exploded bottom perspective view of a fixed frame of a first actuator according to an example.
Figure 10:
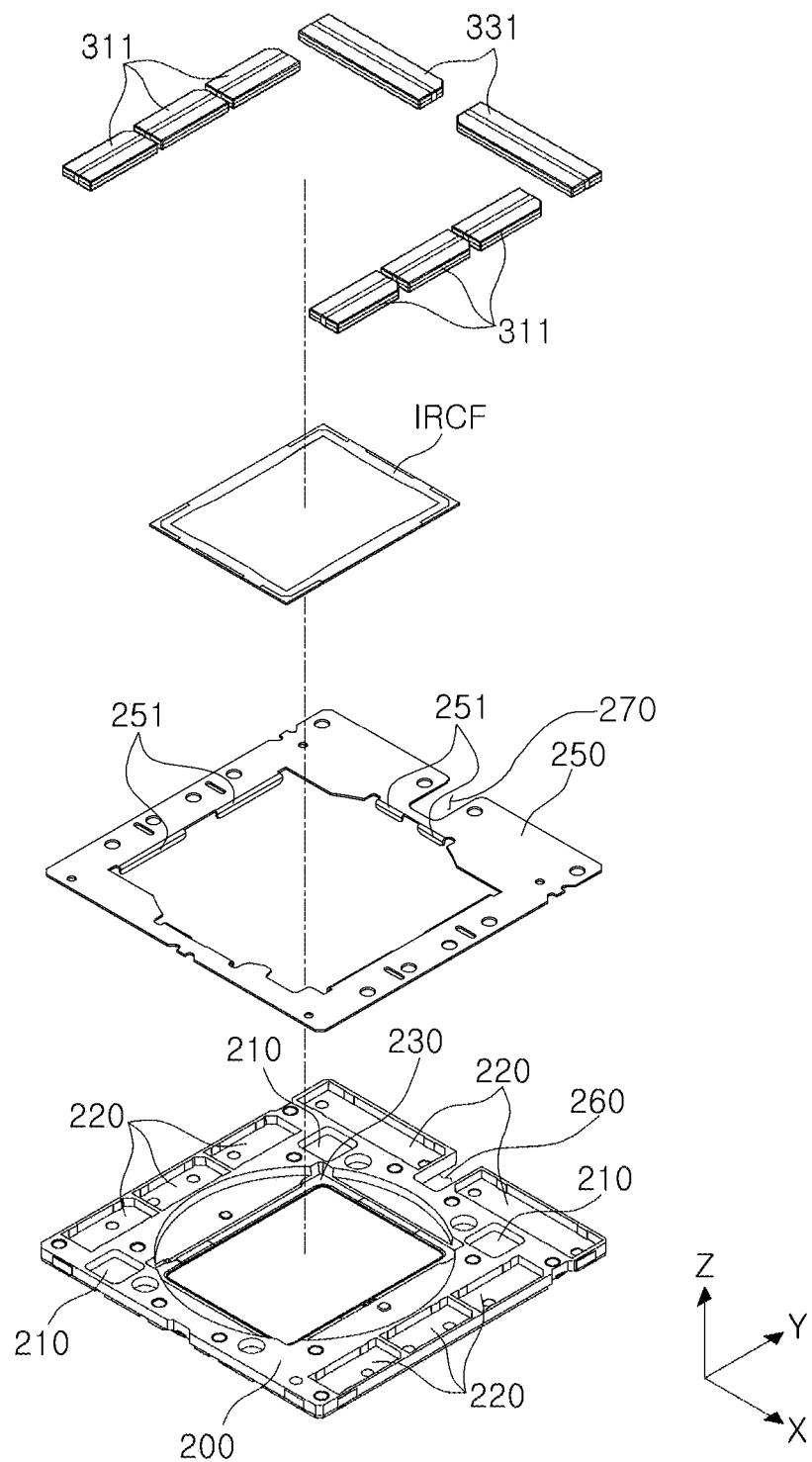
FIG. 10 is an exploded perspective view of a movable frame of a first actuator according to an example.

FIG. 4 is a perspective view of a fixed frame of a first actuator according to an example, FIG. 5 is an exploded bottom perspective view of a fixed frame of a first actuator according to an example, and FIG. 10 is an exploded perspective view of a movable frame of a first actuator according to an example.

The first actuator 10 may include a fixed frame 100, a movable frame 200, a first driving unit 300, a sensor substrate 400, and a base 500.

The fixed frame 100 may be coupled to the second actuator 20. For example, the fixed frame 100 may be coupled to a housing 60 of the second actuator 20.

The fixed frame 100 may be a fixing member that does not move during focus adjustment and OIS.

The fixed frame 100 may have a rectangular plate shape with a central portion penetrated in the optical axis (the Z-axis) direction.

The movable frame 200 may be accommodated in the fixed frame 100. For example, the fixed frame 100 may include a sidewall extending in the optical axis (the Z-axis) direction to form a space, and the movable frame 200 may be accommodated in the space formed by the sidewall.

The movable frame 200 may be a moving member moving during OIS. The movable frame 200 may be relatively moved on a plane (the X-Y plane) perpendicular to the optical axis (the Z-axis) with respect to the fixed frame 100. For example, the movable frame 200 may be moved in the direction of the first axis (the X-axis) and the second axis (the Y-axis) perpendicular to the optical axis (the Z-axis), or may be rotated based on the optical axis (the Z-axis) as a rotation axis.

Here, the first axis (the X-axis) may refer to a direction perpendicular to the optical axis (the Z-axis), and the second axis (the Y-axis) may refer to a direction perpendicular to the optical axis (the Z-axis) and the first axis (the X-axis).

The movable frame 200 may have a rectangular plate shape with a central portion penetrated in the optical axis (the Z-axis) direction.

An infrared cut filter (IRCF) may be mounted on an upper surface of the central portion of the movable frame 200. For example, a filter mounting recess 230 in which the IRCF is mounted may be provided on the upper surface of the central portion of the movable frame 200.

Also, the sensor substrate 400 may be disposed on a lower surface of the central portion of the movable frame 200.

A first ball member B1 may be disposed between the fixed frame 100 and the movable frame 200. The first ball member B1 may be disposed between the fixed frame 100 and the movable frame 200 to contact the fixed frame 100 and the movable frame 200, respectively.

The first ball member B1 may guide and support movement of the movable frame 200 by performing a rolling motion when the movable frame 200 is relatively moved or rotated with respect to the fixed frame 100.

In the structure in which the movable frame 200 is accommodated in the fixed frame 100 as described above, in order to reduce a height in the optical axis (the Z-axis) direction of the first actuator 10, a height of the movable frame 200 in the optical axis (the Z-axis) direction needs to be reduced. However, if the height of the movable frame 200 in the optical axis (the Z-axis) direction is reduced, rigidity of the movable frame 200 may be weakened, thereby reducing reliability due to external impact or the like.

Accordingly, a reinforcing plate 250 may be provided to reinforce the rigidity of the movable frame 200. The movable frame 200 may include the reinforcing plate 250 reinforcing the rigidity of the movable frame 200.

The reinforcing plate 250 may be formed of a material having rigidity higher than that of the movable frame 200. In addition, the reinforcing plate 250 may be formed of a material having thermal conductivity higher than that of the movable frame 200. For example, the movable frame 200 may be formed of a plastic material, and the reinforcing plate 250 may be formed of a stainless steel material.

The reinforcing plate 250 may be integrally formed with the movable frame 200. For example, the movable frame 200 including the reinforcing plate 250 may be manufactured through an insert injection method, and accordingly, the reinforcing plate 250 and the movable frame 200 may be integrated.

Basically, the reinforcing plate 250 may be disposed inside the movable frame 200, and a partial region thereof may be exposed to the outside.

The movable frame 200 may include a plurality of recesses, and through the recesses, a partial region of the reinforcing plate 250 may be exposed in an optical axis (the Z-axis) direction. For example, the reinforcing plate 250 may include a first region 253 and a second region 255 exposed in the direction of an optical axis (the Z-axis). A detailed description thereof will be given later.

In this manner, the reinforcing plate 250 is disposed inside the movable frame 200 but is configured such that a partial region thereof is exposed to the outside, so that a bonding force between the movable frame 200 and the reinforcing plate 250 may be improved and the reinforcing plate 250 may be prevented from being separated from the movable frame 200.

The image sensor S may be mounted on the sensor substrate 400.

A portion of the sensor substrate 400 may be coupled to the movable frame 200 and another portion may be coupled to the fixed frame 100. That is, the sensor substrate 400 may include a portion coupled to the movable frame 200 and a portion coupled to the fixed frame 100, and the image sensor S may be mounted on the portion coupled to the movable frame 200.

Since a portion of the sensor substrate 400 is coupled to the movable frame 200, the portion of the sensor substrate 400 may also be moved or rotated together with the movable frame 200 as the movable frame 200 is moved or rotated.

Accordingly, the image sensor S may be moved on a plane (the X-Y plane) perpendicular to the optical axis (the Z-axis) to perform OIS.

Figure 9:
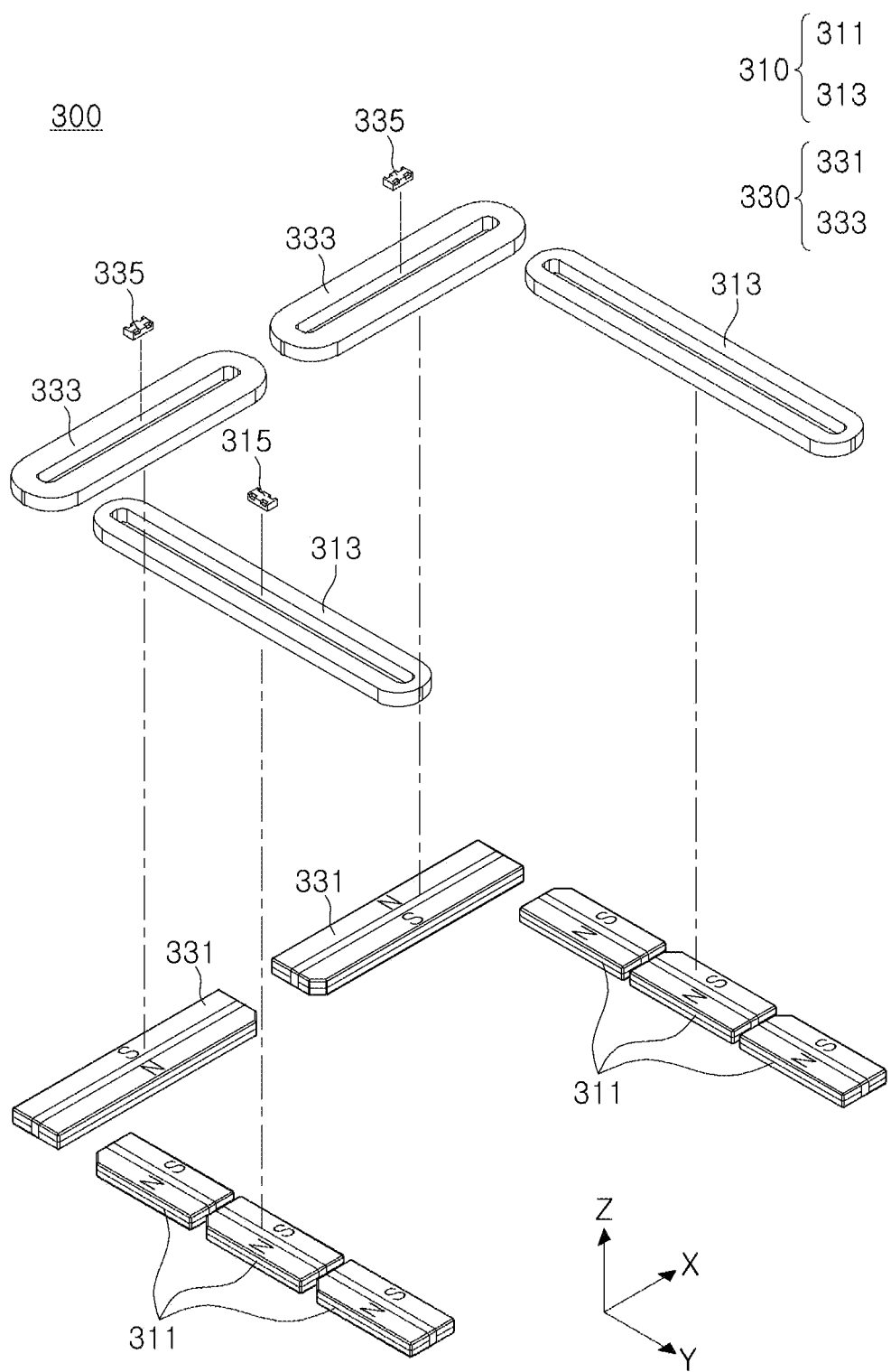
FIG. 9 is an exploded perspective view of a first driving unit of a first actuator according to an example.

FIG. 9 is an exploded perspective view of a first driving unit of a first actuator according to an example.

The first driving unit 300 may generate driving force in a direction of the first axis (the X-axis) perpendicular to the optical axis (the Z-axis) or the second axis (the Y-axis) perpendicular to the optical axis (the Z-axis) and the first axis (the X-axis) and move the movable frame 200 in a direction perpendicular to the optical axis (the Z-axis) or rotate the movable frame 200 based on the optical axis (the Z-axis) as a rotation axis.

The first driving unit 300 may include a first sub-driving unit 310 and a second sub-driving unit 330. For example, the first sub-driving unit 310 may generate driving force in the first axis (the X-axis) direction, and the second sub-driving unit 330 may generate driving force in the second axis (the Y-axis) direction.

The first sub-driving unit 310 may include a first magnet 311 and a first coil 313. The first magnet 311 and the first coil 313 may be disposed to face each other in the optical axis (the Z-axis) direction.

The first magnet 311 may be disposed on the movable frame 200.

The first magnet 311 may include a plurality of magnets. For example, the first magnet 311 may include two magnet sets spaced apart from each other in a direction in which driving force is generated by the first magnet 311, that is, in the first axis (the X-axis) direction. Each of the magnet sets may include at least two magnets arranged in the second axis (the Y-axis) direction.

In another example, it may be possible for each magnet set to include one magnet having a long length in the second axis (the Y-axis) direction, but if the magnet is manufactured to be long in one direction, the possibility of bending and breakage may increase.

Therefore, preferably, a plurality of magnets having a short length in the second axis (the Y-axis) direction may be arranged in the second axis (the Y-axis) direction, thereby improving manufacturing reliability.

The movable frame 200 may include a mounting recess 220 in which the first magnet 311 is disposed on an upper surface. As described above, since the first magnet 311 is disposed in the mounting recess 220 of the movable frame 200, an increase in a height of the first actuator 10 and the camera module 1 in the optical axis (the Z-axis) direction due to a thickness of the first magnet 311 may be prevented.

In a state in which the first magnet 311 is not disposed on the movable frame 200, a partial region of the reinforcing plate 250 may be exposed through the mounting recess 220. The partial region of the reinforcing plate 250 exposed through the mounting recess 220 may be the first region 253.

That is, the reinforcing plate 250 may include the first region 253 exposed in the optical axis (the Z-axis) direction through the mounting recess 220 of the movable frame 200, and a first magnet 311 may be disposed in the mounting recess 220.

According to this structure, the first magnet 311 may be disposed on the reinforcing plate 250. The first magnet 311 may be disposed on the reinforcing plate 250 formed of a material having thermal conductivity higher than that of the movable frame 200.

Therefore, since the first magnet 311 is directly disposed on the reinforcing plate 250, when driving force is generated by the first magnet 311, heat generated by the first magnet 311 may be efficiently dissipated by the reinforcing plate 250.

In addition, the first region 253 may function as a back yoke preventing leakage of magnetic flux of the first magnet 311.

The first magnet 311 may have a shape with a length in the second axis (the Y-axis) direction.

The first magnet 311 may be magnetized so that one side and the other side have both an N pole and an S pole. For example, the first magnet 311 may be magnetized such that a surface thereof facing the first coil 313 has an N pole, a neutral region, and an S pole sequentially in the first axis (the X-axis) direction. In addition, the first magnet 311 may be magnetized such that an opposite surface thereof facing the first coil 313 has an S pole, a neutral region, and an N pole sequentially in the first axis (the X-axis) direction.

The first magnet 311 may include a plurality of magnets, and magnetization directions of the plurality of magnets included in the first magnet 311 may all be the same.

The first coil 313 may be disposed on the fixed frame 100.

The first coil 313 may have a donut shape having a hollow and may have a length in the second axis (the Y-axis) direction.

The first coil 313 may include a plurality of coils. For example, the first coil 313 may include two coils spaced apart from each other in a direction in which driving force is generated by the first coil 313, that is, in the first axis (the X-axis) direction. The two coils may be disposed to face two magnet sets constituting the first magnet 311, respectively.

The first magnet 311 may be a moving member mounted on the movable frame 200 and moving together with the movable frame 200, and the first coil 313 may be a fixed member which is mounted on the fixed frame 100 and does not move.

The first sub-driving unit 310 may generate driving force in a direction perpendicular to a direction in which the first magnet 311 and the first coil 313 face each other, for example, the first axis (the X-axis) direction, by electromagnetic force formed between the first magnet 311 and the first coil 313 as power is applied to the first coil 313. Accordingly, the first sub-driving unit 310 may move the movable frame 200 in the first axis (the X-axis) direction.

The second sub-driving unit 330 may include a second magnet 331 and a second coil 333. The second magnet 331 and the second coil 333 may be disposed to face each other in the optical axis (the Z-axis) direction.

The second magnet 331 may be disposed on the movable frame 200.

The second magnet 331 may include a plurality of magnets. For example, the second magnet 331 may include two magnets spaced apart from each other in a direction perpendicular to a direction in which driving force is generated by the second magnet 331, that is, in the first axis (the X-axis) direction.

The movable frame 200 may include a mounting recess 220 on an upper surface in which the second magnet 331 is disposed. As such, since the second magnet 331 is disposed in the mounting recess 220 of the movable frame 200, an increase in the height of the first actuator 10 and the camera module 1 in the optical axis (the Z-axis) direction due to a thickness of the second magnet 331 may be prevented.

In a state in which the second magnet 331 is not disposed on the movable frame 200, a partial region of the reinforcing plate 250 may be exposed through the mounting recess 220. A partial region of the reinforcing plate 250 exposed through the mounting recess 220 may be the first region 253.

That is, the reinforcing plate 250 may include the first region 253 exposed in the optical axis (the Z-axis) direction through the mounting recess 220 of the movable frame 200, and the second magnet 331 may be disposed in the mounting recess 220.

According to this structure, the second magnet 331 may be disposed on the reinforcing plate 250. The second magnet 331 may be disposed on the reinforcing plate 250 formed of a material having thermal conductivity higher than that of the movable frame 200.

Therefore, since the second magnet 331 is directly disposed on the reinforcing plate 250, when driving force is generated by the second magnet 331, heat generated by the second magnet 331 may be efficiently dissipated by the reinforcing plate 250.

In addition, the first region 253 may function as a back yoke preventing leakage of magnetic flux of the second magnet 331.

The second magnet 331 may have a shape with a length in the first axis (the X-axis) direction.

The second magnet 331 may be magnetized so that one side and the other side have both an N pole and an S pole. For example, the second magnet 331 may be magnetized such that a surface thereof facing the second coil 333 has an N pole, a neutral region, and an S pole sequentially in the second axis (the Y-axis) direction. In addition, the second magnet 331 may be magnetized such that an opposite surface thereof facing the second coil 333 has an S pole, a neutral region, and an N pole sequentially in the second axis (the Y-axis) direction.

The second magnet 331 may include two magnets, and magnetization directions of the two magnets included in the second magnet 331 may all be the opposite to each other.

The second coil 333 may be disposed on the fixed frame 100.

The second coil 333 may have a donut shape having a hollow and may have a length in the first axis (the X-axis) direction.

The second coil 333 may include a plurality of coils. For example, the second coil 333 may include two coils spaced apart from each other in a direction in which driving force is generated by the second coil 333, that is, in the second axis (the Y-axis) direction, and the two coils may be disposed to face two magnets included in second magnet 331, respectively.

The second magnet 331 may be a moving member mounted on the movable frame 200 and moving together with the movable frame 200, and the second coil 333 may be a fixed member which is mounted on the fixed frame 100 and does not move.

The second sub-driving unit 330 may generate driving force in a direction perpendicular to a direction in which the second magnet 331 and the second coil 333 face each other, for example, the second axis (the Y-axis) direction, by electromagnetic force formed between the second magnet 331 and the second coil 333 as power is applied to the second coil 333. Accordingly, the first sub-driving unit 310 may move the movable frame 200 in the second axis (the Y-axis) direction.

The first actuator 10 may rotate the movable frame 200 on a plane (the X-Y plane) perpendicular to the optical axis (the Z-axis) by the first sub-driving unit 310 and the second sub-driving unit 330.

The first actuator 10 may generate rotational force for rotating the movable frame 200 by controlling driving force of the first sub-driving unit 310 and driving force of the second sub-driving unit 330. For example, the first actuator 10 may generate a rotation force by generating a difference between the driving force of the first sub-driving unit 310 and the driving force of the second sub-driving unit 330, by using a resultant force of the driving force of the first sub-driving unit 310 and the driving force of the second sub-driving unit 330, or by using the two second magnets 331 and the second coil 333 included in the second sub-driving unit 330.

To this end, the first sub-driving unit 310 and the second sub-driving unit 330 may be disposed perpendicular to each other on a plane (the X-Y plane) perpendicular to the optical axis (the Z-axis). For example, the first magnet 311 and the second magnet 331 may be disposed perpendicular to each other on a plane (the X-Y plane) perpendicular to the optical axis (the Z-axis) of the movable frame 200, and the first coil 313 and the second coil 333 may be disposed perpendicular to each other on a plane (the X-Y plane) perpendicular to the optical axis (the Z-axis) of the fixed frame 100.

Meanwhile, on the same concept, when rotation is not required, the driving force of the first sub-driving unit 310 and/or the driving force of the second sub-driving unit 330 may be controlled to cancel out unintentionally generated rotational force.

The first ball member B1 may be disposed between the fixed frame 100 and the movable frame 200. The first ball member B1 may be disposed to contact each of the fixed frame 100 and the movable frame 200 between the fixed frame 100 and the movable frame 200.

The first ball member B1 may include a plurality of balls disposed between the fixed frame 100 and the movable frame 200.

The first ball member B1 may function to guide and support movement of the movable frame 200 during OIS. In addition, the first ball member B1 may function to maintain a gap between the fixed frame 100 and the movable frame 200.

The first ball member B1 may guide movement of the movable frame 200 in the first axis (the X-axis) direction by rolling in the first axis (the X-axis) direction when driving force is generated in the first axis (the X-axis) direction.

In addition, the first ball member B1 may guide movement of the movable frame 200 in the second axis (the Y-axis) direction by rolling in the second axis (the Y-axis) direction when driving force is generated in the second axis (the Y-axis) direction.

The fixed frame 100 and the movable frame 200 may include guide recesses in which the first ball member B1 is disposed on surfaces facing each other in the optical axis (the Z-axis) direction.

Since the first ball member B1 includes a plurality of balls, the guide recess may include a plurality of recesses provided in a number corresponding to the plurality of balls included in the first ball member B1.

The fixed frame 100 may include a first recess 170 on a lower surface, and the movable frame 200 may include a second recess 210 on an upper surface.

The first recess 170 and the second recess 210 may face each other in the optical axis (the Z-axis) direction, and the first ball member B1 may be disposed between the first recess 170 and the second recess 210.

The first recess 170 and the second recess 210 may have a circular or polygonal planar shape. Also, the diameters or horizontal and vertical lengths of the first recess 170 and the second recess 210 may be larger than a diameter of the first ball member B1.

Accordingly, the first ball member B1 may roll on a plane (the X-Y plane) perpendicular to the optical axis (the Z-axis) in a state disposed between the first recess 170 and the second recess 210.

In a state in which the first ball member B1 is not disposed on the movable frame 200, a partial region of the reinforcing plate 250 may be exposed through the second recess 210. The partial region of the reinforcing plate 250 exposed through the second recess 210 may be the second region 255.

That is, the reinforcing plate 250 may include the second region 255 exposed in the optical axis (the Z-axis) direction through the second recess 210 of the movable frame 200, and the first ball member B1 may be disposed in the second recess 210.

According to this structure, the first ball member B1 disposed on the reinforcing plate 250 may perform a rolling motion. The first ball member B1 may perform a rolling motion while being disposed on the reinforcing plate 250 formed of a material having rigidity higher than that of the movable frame 200.

Since the first ball member B1 is a ceramic material and the movable frame 200 is a plastic material, when the first ball member B1 is disposed on the movable frame 200, the second recess 210 may be damaged due to a difference in rigidity if an external impact is applied.

Since the first ball member B1 is in direct contact with the reinforcing plate 250, ball dents due to external impact may be prevented, and thus, OIS performance may be improved.

The first actuator 10 may detect a position of the movable frame 200 on a plane (the X-Y plane) perpendicular to the optical axis (the Z-axis) of the movable frame 200.

To this end, the first sub-driving unit 310 and the second sub-driving unit 330 may include a first position sensor 315 and a second position sensor 335, respectively. For example, the first position sensor 315 and the second position sensor 335 may be hall sensors.

The first position sensor 315 and the second position sensor 335 may be disposed on the fixed frame 100. The first position sensor 315 and the second position sensor 335 may be disposed inside the first coil 313 and the second coil 333, respectively, and face the first magnet 311 and the second magnet 331.

For example, one first position sensor 315 may be provided and may face a magnet disposed in the middle among a plurality of magnets included in any one magnet set, among two magnet sets constituting the first magnet 311.

In addition, two second position sensors 335 may be provided, and the two position sensors may be spaced apart from each other in the first axis (the X-axis) direction and face the two magnets included in the second magnet 331, respectively.

The rotation of the movable frame 200 may be detected by the second position sensor 335 including two position sensors.

Figure 6:
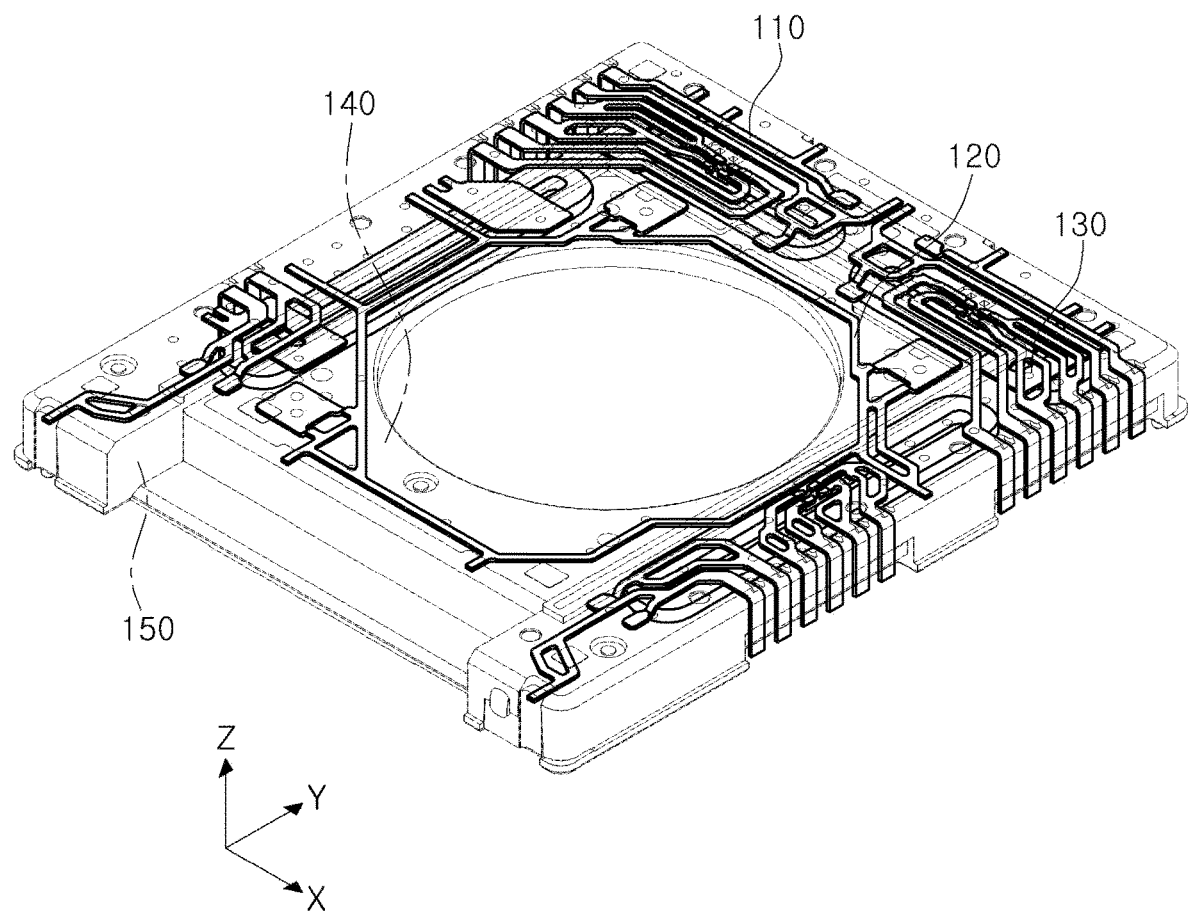
FIG. 6 is a perspective view illustrating a wiring pattern, a support pad, and a yoke portion disposed inside a fixed frame of a first actuator according to an example.
Figure 7:
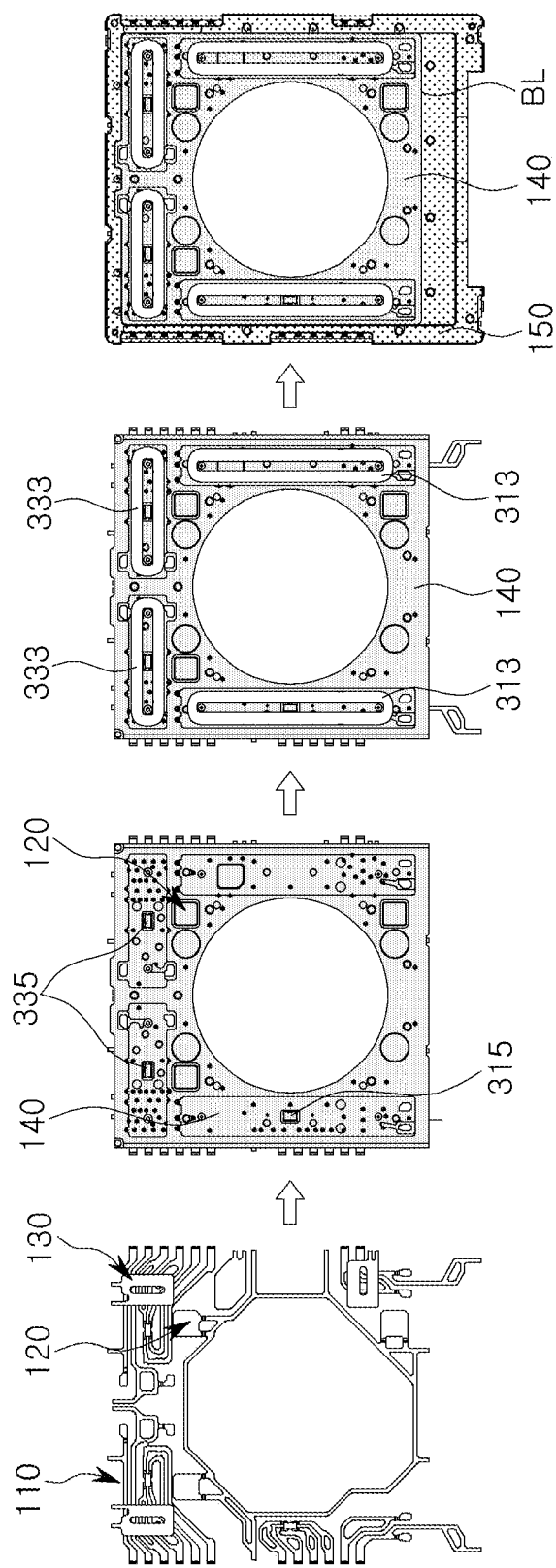
FIG. 7 is a diagram illustrating a manufacturing process of a fixed frame of a first actuator according to an example.
Figure 8:
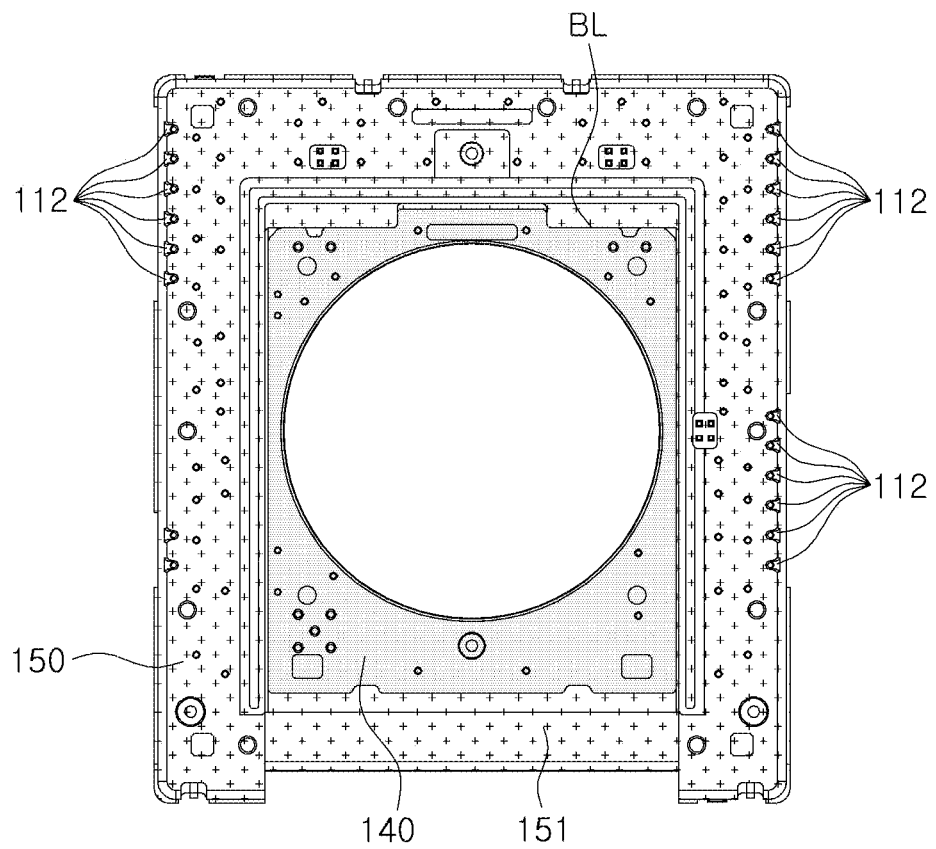
FIG. 8 is a plan view illustrating a structure before a shield can is coupled to a fixed frame of a first actuator according to an example.

FIG. 6 is a perspective view illustrating a wiring pattern, a support pad, and a yoke portion disposed inside a fixed frame of a first actuator according to an example, FIG. 7 is a diagram illustrating a manufacturing process of a fixed frame of a first actuator according to an example, and FIG. 8 is a plan view illustrating a structure before a shield can is coupled to a fixed frame of a first actuator according to an example.

The fixed frame 100 may have a wiring pattern 110 therein. The wiring pattern 110 may be connected to the first coil 313 and the second coil 333. Accordingly, the first coil 313 and the second coil 333 may receive power through the wiring pattern 110.

According to an example, the camera module 1 does not have a separate printed circuit board for supplying power to the first driving unit 300, and the fixed frame 100 itself may include the wiring pattern 110 supplying power to the first driving unit 300.

The wiring pattern 110 may also be connected to the sensor substrate 400.

The wiring pattern 110 may be integrally formed with the fixed frame 100. For example, the wiring pattern 110 may be manufactured through an insert injection method, and thus the wiring pattern 110 and the fixed frame 100 may be integrated.

The camera module 1 may undergo injection molding at least twice in the process of manufacturing the fixed frame 100.

During primary insert injection molding, a primary injection molding product (for example, a first frame 140) integrated with the wiring pattern 110 may be manufactured, and through secondary insert injection molding, a secondary injection molding product (for example, a second frame 150) integrated with the first injection molding product may be manufactured.

In this manner, when injections are performed twice, a boundary line BL may be formed between the first frame 140 as the primary injection molding product and the second frame 150 as the secondary injection molding product.

The first coil 313, the second coil 333, the first position sensor 315, and the second position sensor 335 may be disposed in the first frame 140, which is the primary injection molding product, and may be connected to the wiring pattern 110 provided in the first frame 140.

Referring to FIG. 7, it is illustrated that, after the first injection, the first coil 313, the second coil 333, the first position sensor 315, and the second position sensor 335 are disposed on the first frame 140 and the second injection is then performed. However, they may be placed in the first frame 140 after the first and second injections.

The wiring pattern 110 may include a wiring portion 111 and a terminal portion 112.

The wiring portion 111 may be disposed inside the first frame 140.

The terminal portion 112 may be disposed to be exposed to the outside of the first frame 140 and the second frame 150. The wiring pattern 110 may be connected to the sensor substrate 400 through the terminal portion 112.

The first frame 140 may include a guide recess in which the first ball member B1 is disposed, that is, the first recess 170.

Since the first ball member B1 is formed of a ceramic material and the first frame 140 is formed of a plastic material, the first recess 170 may be damaged due to a difference in rigidity when an external impact is applied.

To prevent this, a support pad 120 may be disposed on a bottom surface of the first recess 170. A portion of the support pad 120 may form a bottom surface of the first recess 170, and the first ball member B1 may perform a rolling motion on the support pad 120.

The support pad 120 of the fixed frame 100 may have a component corresponding to the reinforcing plate 250 of the movable frame 200. For example, the support pad 120 may be formed of stainless steel.

The support pad 120 may be insert-injected together with the wiring pattern 110 during the primary injection molding to be integrally formed with the first frame 140.

A portion of the support pad 120 may be disposed inside the first frame 140, and another portion may be exposed to the outside of the first frame 140. For example, another portion of the support pad 120 may be exposed to the outside of the first frame 140 through the first recess 170.

A yoke portion 130 may be disposed inside the fixed frame 100.

The yoke portion 130 may provide an attractive force in the optical axis (the Z-axis) direction so that the first ball member B1 may maintain contact with the fixed frame 100 and the movable frame 200.

The yoke portion 130 may be insert-injected together with the wiring pattern 110 during the primary injection molding to be formed integrally with the first frame 140.

The yoke portion 130 may be disposed to face the first magnet 311 and the second magnet 331 in the optical axis (the Z-axis) direction.

The yoke portion 130 may include a plurality of yokes. For example, the yoke portion 130 may include four yokes to face two magnet sets constituting the first magnet 311 and the second magnet 331, respectively. If the center of gravity acting between the first magnet 311, the second magnet 331, and the yoke portion 130 is located within a support region formed by connecting the plurality of balls included in the first ball member B1, the number of yokes included in the yoke portion 130 is not particularly limited.

An attractive force may act between the yoke portion 130 and the first magnet 311 and between the yoke portion 130 and the second magnet 331 in the optical axis (the Z-axis) direction.

The yoke portion 130 may be provided as a magnetic material to generate an attractive force with the first magnet 311 and the second magnet 331.

Therefore, since the movable frame 200 is pressed in a direction in which the movable frame 200 faces the fixed frame 100, the first ball member B1 may maintain contact with the movable frame 200 and the fixed frame 100.

The fixed frame 100 may include a shield can 160 shielding electromagnetic waves.

The shield can 160 may be coupled to cover at least a portion of an upper surface and a side surface of the second frame 150, which is a secondary injection molding product of the fixed frame 100.

Figure 11A:
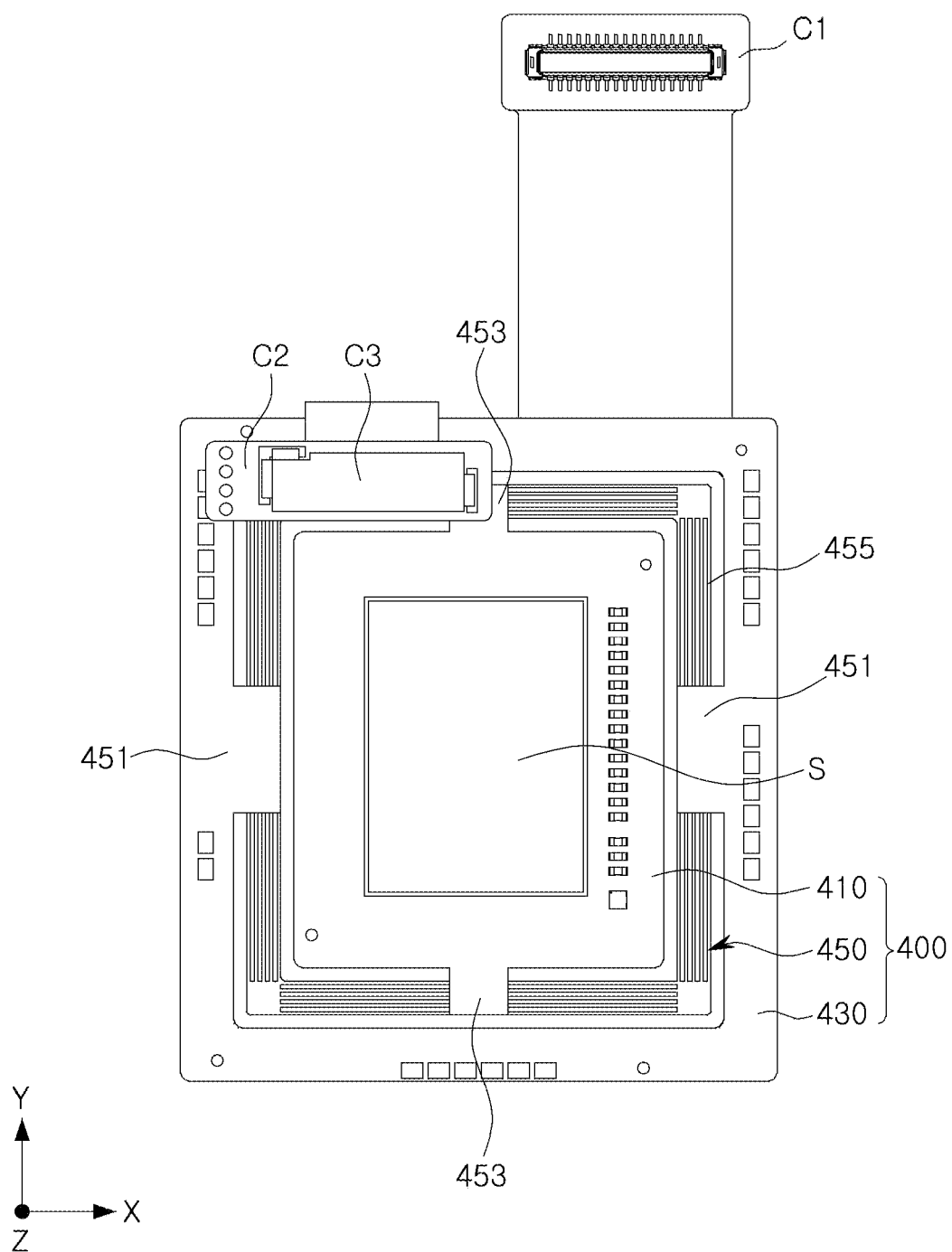
FIGS. 11A and 11B are plan views of a sensor substrate of a first actuator according to an example.
Figure 11B:
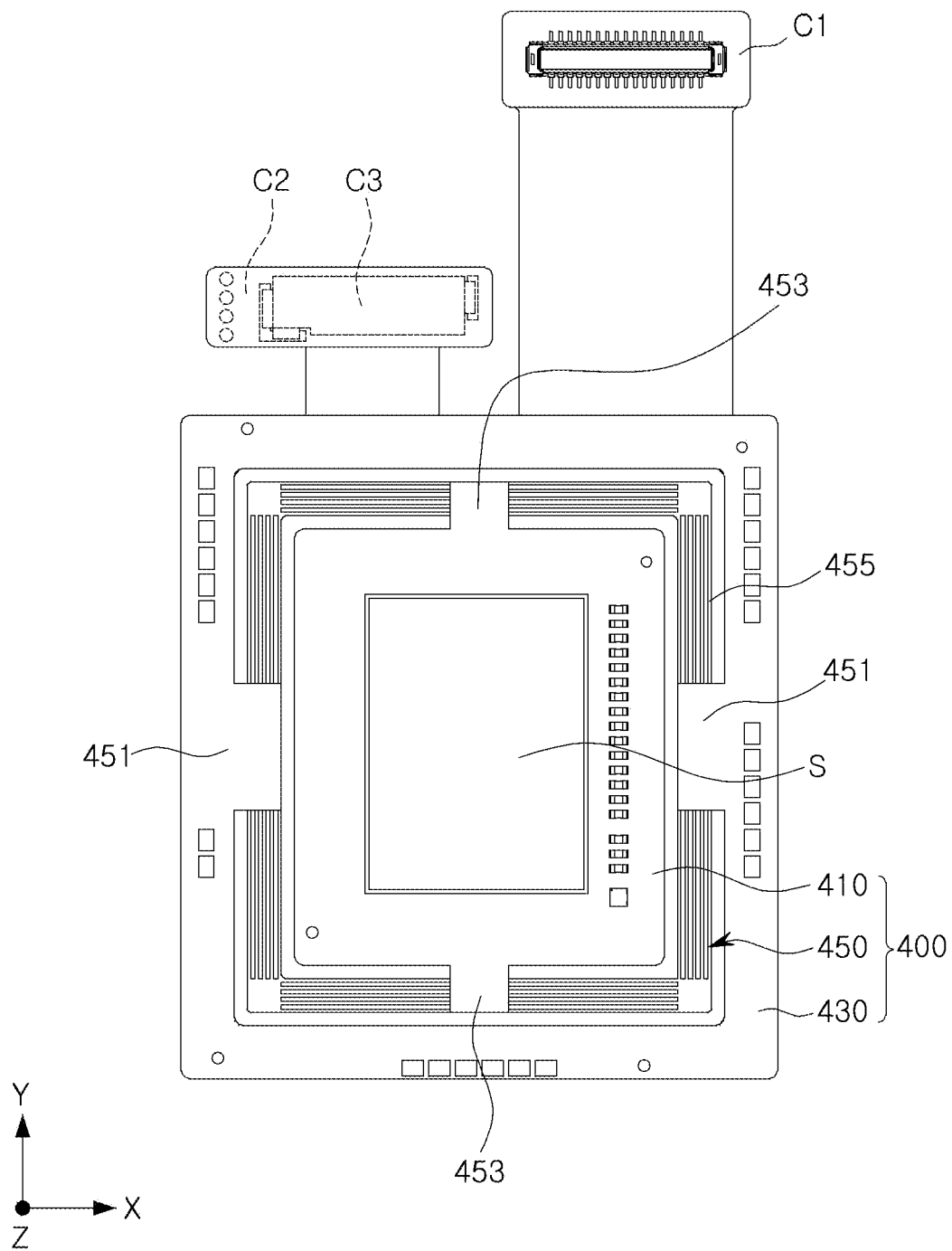
Figure 12:
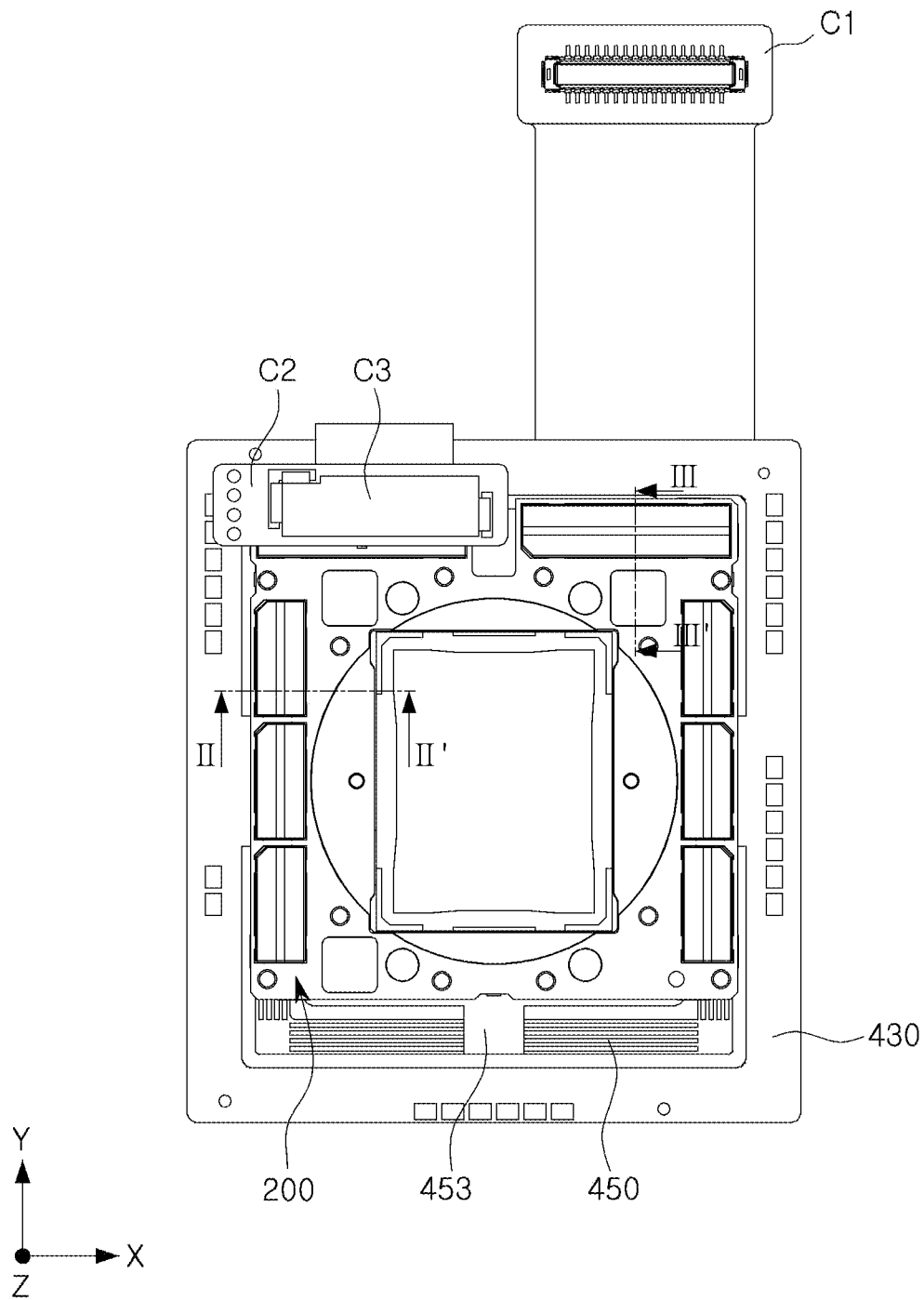
FIG. 12 is a plan view illustrating a state in which a movable frame of a first actuator and a sensor substrate are coupled according to an example.
Figure 13:
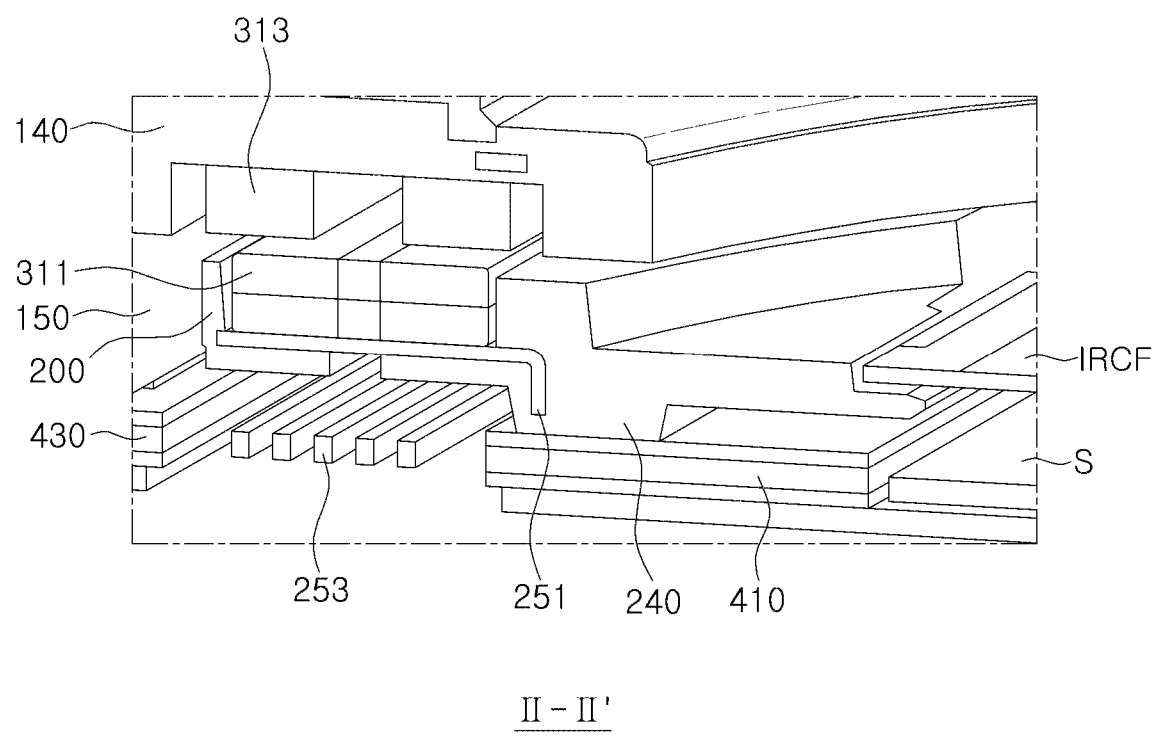
FIG. 13 is an enlarged view of a portion of a cross-section (in an optical axis direction) of II-II' of FIG. 12.
Figure 14:
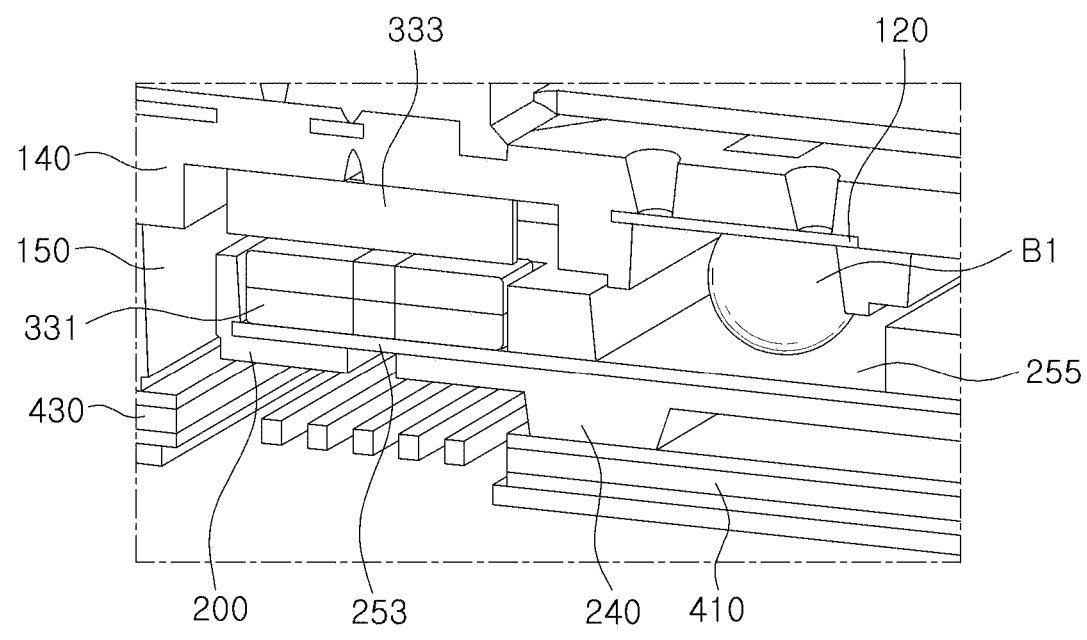
FIG. 14 is an enlarged view of a portion of a cross-section (in the optical axis direction) of line III-III' in FIG. 12.

FIGS. 11A and 11B are plan views of a sensor substrate of a first actuator according to an example, FIG. 12 is a plan view illustrating a state in which a movable frame of a first actuator and a sensor substrate are coupled according to an example, FIG. 13 is an enlarged view of a portion of a cross-section (in an optical axis direction) of I' of FIG. 12, and FIG. 14 is an enlarged view of a portion of a cross-section (in the optical axis direction) of line III-III' in FIG. 12.

The sensor substrate 400 may include a movable portion 410, a fixed portion 430, and a connecting portion 450.

The sensor substrate 400 may be a rigid-flexible printed circuit board. For example, the movable portion 410 and the fixed portion 430 may be a rigid printed circuit board (PCB), and the connecting portion 450 may be a flexible PCB.

The movable portion 410 may be a portion in which the image sensor S is mounted.

Also, the movable portion 410 is a portion coupled to the movable frame 200 and may be a moving member moving together with the movable frame 200 during OIS. The movable portion 410 may be coupled to a lower surface of the movable frame 200.

For example, an area of the movable portion 410 is larger than an area of the image sensor S, and the portion of the movable portion 410 on which the image sensor S is not mounted may be coupled to the lower surface of the movable frame 200.

Referring to FIG. 2, the lower surface of the movable frame 200 may include a protrusion 240 protruding toward the sensor substrate 400. For example, the movable portion 410 of the sensor substrate 400 may be coupled to the protrusion 240 of the movable frame 200.

As the lower surface of the movable frame 200 includes a protrusion 240, a gap (hereinafter referred to as an air gap) may be formed between the movable frame 200 and the sensor substrate 400 in the optical axis (the Z-axis) direction. Accordingly, when the movable frame 200 is moved on a plane (the X-Y plane) perpendicular to the optical axis (the Z-axis), the movable frame 200 may not interfere with the sensor substrate 400.

Although the lower surface of the movable frame 200 is illustrated as including the protrusion 240 in the drawings, the upper surface of the sensor substrate 400 may include a protrusion in another configuration.

The fixed portion 430 is a portion coupled to the fixed frame 100 and may be a fixing member that does not move during OIS. The fixed portion 430 may be coupled to the lower surface of the fixed frame 100.

The fixed portion 430 may surround the movable portion 410. For example, the fixed portion 430 may be formed along the outer circumference of the movable portion 410, and a gap may be formed between the movable portion 410 and the fixed portion 430 in the first axis (the X-axis) and the second axis (the Y-axis) directions.

The connecting portion 450 may be disposed between the movable portion 410 and the fixed portion 430. For example, the connecting portion 450 may be disposed in a space in which a gap is formed between the movable portion 410 and the fixed portion 430, and may connect the movable portion 410 and the fixed portion 430.

The connecting portion 450 may be provided as a flexible PCB and may be bent when the movable portion 410 is moved.

The connecting portion 450 may be formed along an outer circumference of the movable portion 410 in a space in which a gap is formed between the movable portion 410 and the fixed portion 430.

The connecting portion 450 may have a plurality of slits passing through the connecting portion 450 in the optical axis (the Z-axis) direction. In addition, the connecting portion 450 may include a plurality of bridge elements 455 spaced apart from each other by a plurality of slits.

The connecting portion 450 may include a first support portion 451 and a second support portion 453 connected to the movable portion 410 and the fixed portion 430.

The first support portion 451 may connect the connecting portion 450 and the fixed portion 430, and the second support portion 453 may connect the connecting portion 450 and the movable portion 410.

In detail, the first support portion 451 may be in contact with the fixed portion 430 and be spaced apart from the movable portion 410, whereas the second support portion 453 may be in contact with the movable portion 410 and be spaced apart from the fixed portion 430.

For example, the first support portion 451 may include two support portions spaced apart from each other in the first axis (the X-axis) direction, and each support portion may extend in the first axis (the X-axis) direction to connect a plurality of bridges and the fixed portion 430.

In addition, the second support portion 453 may include two support portions spaced apart from each other in the second axis (the Y-axis) direction, and each support portion may extend in the second axis (the Y-axis) direction to connect a plurality of bridge elements 455 and the movable portion 410.

The movable portion 410 may be moved in a direction perpendicular to the optical axis (the Z-axis) or rotated based on the optical axis (the Z-axis), while being supported by the connecting portion 450.

For example, when the movable portion 410 is moved in the first axis (the X-axis) direction, the plurality of bridge elements 455 connected to the first support portion 451 may be bent, and when the movable portion 410 is moved in the second axis (the Y-axis) direction, the plurality of bridge elements 455 connected to the second support portion 453 may be bent. In addition, when the movable portion 410 is rotated based on the optical axis (the Z-axis), the plurality of bridge elements 455 connected to the first support portion 451 and the plurality of bridge elements 455 connected to the second support portion 453 may all be bent.

In this manner, the plurality of bridge elements 455 of the connecting portion 450 may have fluidity. However, when the sensor substrate 400 and the movable frame 200 are coupled in this state, it is difficult to fix the position of the movable portion 410, so the plurality of bridge elements 455 of the connecting portion 450 needs to have fluidity after connecting the sensor substrate 400 and the movable frame 200. In other words, when the sensor substrate 400 and the movable frame 200 are coupled, the plurality of bridge elements 455 of the connecting portion 450 should not have fluidity.

To this end, the sensor substrate 400 and the movable frame 200 may be connected in a state in which any one of the first support portion 451 and the second support portion 453 is connected to all of the movable portion 410, the fixed portion 430, and the plurality of bridge elements 455.

For example, before coupling the sensor substrate 400 and the movable frame 200, the first support portion 451 may be connected to the fixed portion 430 and may be spaced apart from the movable portion 410, but the second support portion 453 may be connected to all of the movable portion 410, the fixed portion 430, and the plurality of bridge elements 455. Accordingly, the plurality of bridge elements 455 may not have fluidity.

The movable frame 200 may include a first escape hole 260 and a second escape hole 270 passing through the movable frame 200 in the optical axis (the Z-axis) direction.

When the sensor substrate 400 and the movable frame 200 are coupled, the portions of the second support portion 453 and the fixed portion 430 connected to each other may be exposed through the first escape hole 260 and the second escape hole 270 of the movable frame 200.

The connected portions of the second support portion 453 and the fixed portion 430 may be cut through the first escape hole 260 and the second escape hole 270, and the movable portion 410 of the sensor substrate 400 may have fluidity after being coupled to the movable frame 200.

The sensor substrate 400 may have a rectangular shape. In other words, a length of the fixed portion 430 in the first axis (the X-axis) direction and a length in the second axis (the Y-axis) direction may be different from each other. For example, the length of the fixed portion 430 in the first axis (the X-axis) direction may be shorter than the length in the second axis (the Y-axis) direction.

In the case of the sensor substrate 400 of this type, when the first support portion 451 and the second support portion 453 are formed to have the same length, a load applied to the plurality of bridge elements 455 connected to the first support portion 451 and a load applied to the plurality of bridge elements 455 connected to the second support portion 453 may be different, and thus, there may be a difficulty in controlling driving.

Therefore, by making the lengths of the first support portion 451 and the second support portion 453 different from each other, the length of the plurality of bridge elements 455 connected to the first support portion 451 and the plurality of bridge elements 455 connected to the second support portion 453 may be made approximately the same.

A driver IC C3 for controlling driving of the first driving unit 300 may be disposed on the sensor substrate 400.

The driver IC C3 may be disposed on a connecting substrate C2, and the connecting substrate C2 may be connected to the fixed portion 430 by a flexible PCB.

The driver IC C3 may be fixedly coupled to an upper surface of the fixed frame 100, for example, an upper surface of the shield can 160. That is, the connecting substrate C2 on which the driver IC C3 is disposed may be disposed on an upper surface of the fixed frame 100 by using bendable properties of the flexible PCB.

Therefore, since there is no need to secure a separate space for disposing the connecting substrate C2, a size of the camera module 1 may be reduced.

A first connector C1 to be connected to an external power source may be extended and disposed on the fixed portion 430 of the sensor substrate 400.

The base 500 may be coupled to a lower portion of the sensor substrate 400.

The base 500 may be coupled to the sensor substrate 400 to cover a lower portion of the sensor substrate 400. The base 500 may prevent external foreign substances from entering through a gap between the movable portion 410 and the fixed portion 430 of the sensor substrate 400.

A heat dissipation film 510 may be disposed below the base 500 to effectively dissipate heat generated by the image sensor S.

The heat dissipation film 510 may be disposed to cover a lower portion of the base 500, and may further cover at least one of a side surface of the sensor substrate 400 and a side surface of the first actuator 10 as necessary.

The camera module 1 may have an air gap between the movable frame 200 and the sensor substrate 400 in the optical axis (the Z-axis) direction to perform OIS. That is, an air gap is formed around the image sensor S, and the air gap may trap heat generated by the image sensor S to hinder heat dissipation, which may lead to a degradation of the image sensor S.

Accordingly, the camera module 1 may have a structure for improving heat dissipation performance.

The reinforcing plate 250 may include a bent portion 251 bent toward the sensor substrate 400.

The reinforcing plate 250 may be formed of a material having high thermal conductivity, and thus, heat dissipation performance of the camera module 1 may be improved through a structure in which an area of the reinforcing plate 250 is increased. For example, the reinforcing plate 250 may be formed of a stainless steel material.

In particular, the reinforcing plate 250 may have a structure in which an area is extended toward the sensor substrate 400 in order to efficiently dissipate heat around the sensor substrate 400. That is, the bent portion 251 may expand the area of the reinforcing plate 250 in a direction of narrowing the gap with the sensor substrate 400.

Since the movable frame 200 and the sensor substrate 400 are disposed in the optical axis (the Z-axis) direction, the bent portion 251 may be bent at one end of the reinforcing plate 250 and extended substantially in the optical axis (the Z-axis) direction.

The movable frame 200 may include a protrusion 240 on a lower surface thereof, to which the sensor substrate 400 is coupled, and the bent portion 251 may be disposed on the protrusion 240. For example, one end of the bent portion 251 may be disposed on the main body of the movable frame 200 and the other end of the bent portion 251 may be disposed on the protrusion 240. However, depending on a shape of the bent portion 251, the portion extending in the optical axis (the Z-axis) direction including the other end of the bent portion 251 may be disposed on the protrusion 240.

The bent portion 251 may be provided inside the movable frame 200 and may not be exposed to the outside.

Since the sensor substrate 400 is disposed to be adjacent to the bent portion 251 extending from the reinforcing plate 250 formed of a material having high thermal conductivity, heat generated by the image sensor S may be efficiently dissipated by the bent portion 251.

Referring to FIG. 10, the bent portion 251 may be bent and extended from an inner end of the reinforcing plate 250 toward the sensor substrate 400. For example, the reinforcing plate 250 may include a hollow portion passing through the reinforcing plate 250 in the optical axis (the Z-axis) direction at a central portion, and the inner end of the reinforcing plate 250 may refer to a portion forming a circumference of the hollow portion.

A plurality of bent portions 251 may be provided. That is, the reinforcing plate 250 may include a plurality of bent portions 251 bent and extended from one inner end toward the sensor substrate 400.

A plurality of bent portions 251 may be provided along a region in which the first magnet 311 and the second magnet 331 are disposed. For example, the plurality of bent portions 251 may be provided in the second axis (the Y-axis) direction in a region in which the first magnet 311 is disposed, more specifically, in each region in which two magnet sets constituting the first magnet 311 are disposed, and may be provided in the first axis (the X-axis) direction in the region in which the second magnet 331 is disposed.

In the drawings, the plurality of bent portions 251 is illustrated in the region in which the first magnet 311 is disposed and the region in which the second magnet 331 is disposed, but in another example configuration, the adjacent bent portions 251 may be integrally formed.

The reinforcing plate 250 according to the various examples may include the bent portion 251 extending in the optical axis (the Z-axis) direction toward the sensor substrate 400, the first region 253, in which the magnet is disposed, exposed in the optical axis (the Z-axis) direction, and the second region 255, in which the first ball member B1 is disposed, exposed in the optical axis (the Z-axis) direction.

Since the first ball member B1 is disposed closer to the optical axis (the Z-axis) than the first and second magnets 311 and 331 based on a plane (the X-Y plane) perpendicular to the optical axis (the Z-axis), the first region 253 may be disposed outside the second region 255 based on the plane (the X-Y plane) perpendicular to the optical axis (the Z-axis). Also, the bent portion 251 may be disposed between the first region 253 and the second region 255 based on a direction perpendicular to the optical axis (the Z-axis).

An IRCF is mounted on the movable frame 200, and a distance from the IRCF to one side of the movable frame 200 and a distance to another side facing the one side may be different.

For example, a +Y-axis direction distance from the IRCF to one side of the movable frame 200 and a −Y-axis direction distance to the other side of the movable frame 200 may be different, and the +Y-axis direction distance may be longer than the −Y axis direction distance.

Accordingly, in a state in which the movable frame 200 is coupled to the sensor substrate 400, any one of the second support portions 453 and a plurality of bridge elements 455 connected thereto may be exposed in the optical axis (the Z-axis) direction. This may be to secure a space for disposing the second actuator 20.

Figure 15:
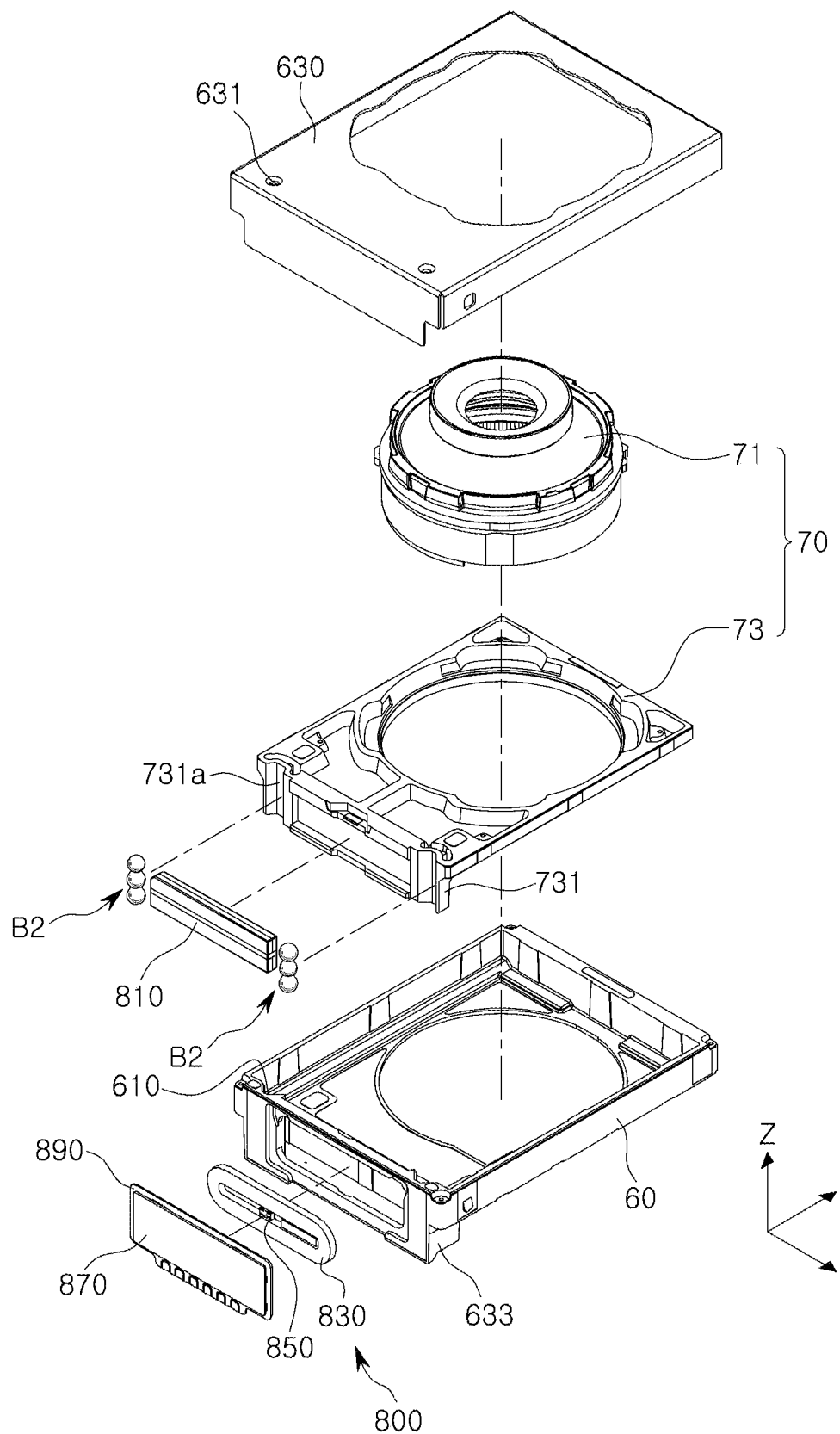
FIG. 15 is a schematic exploded perspective view of a second actuator according to an example.
Figure 16:
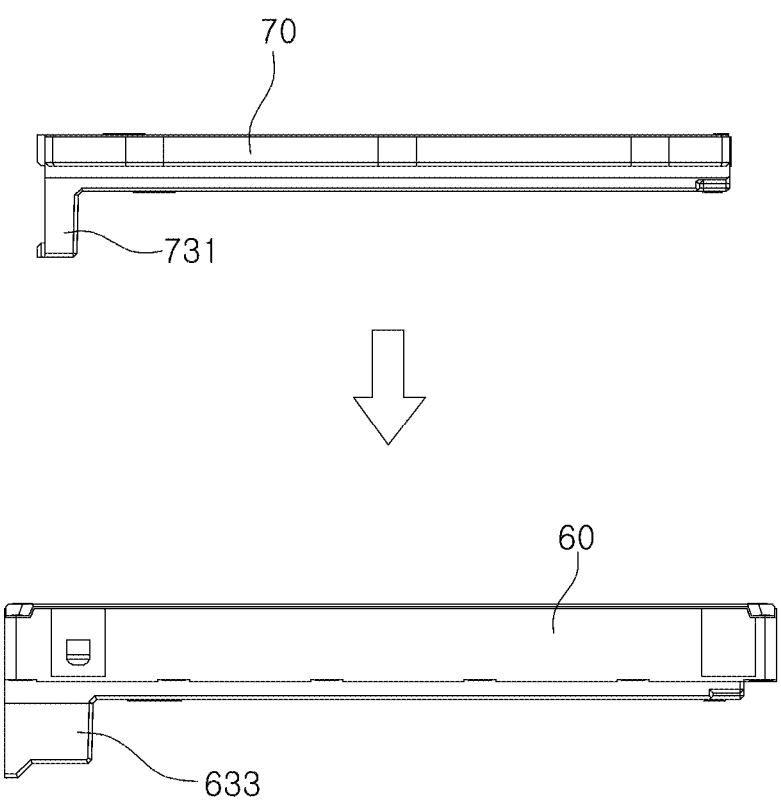
FIG. 16 is a side view of a carrier and a housing of a second actuator according to an example.
Figure 17:
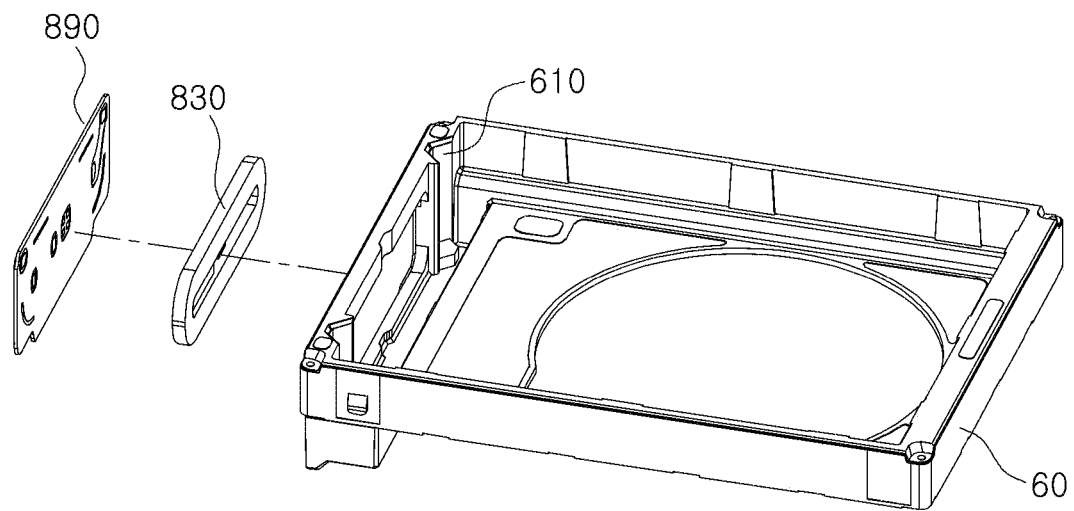
FIG. 17 is a perspective view of a housing of a second actuator according to an example.

FIG. 15 is a schematic exploded perspective view of a second actuator according to an example, FIG. 16 is a side view of a carrier and a housing of a second actuator according to an example, and FIG. 17 is a perspective view of a housing of a second actuator according to an example.

The second actuator 20 may include a carrier 73, a housing 60, a case 630, and a second driving unit 800.

The carrier 73 may include a hollow portion passing through the carrier 73 in the optical axis (the Z-axis) direction, and the lens barrel 71 may be disposed to be inserted into the hollow portion. The lens barrel 71 may be disposed to be fixed to the carrier 73.

Accordingly, the lens barrel 71 may be moved along with the carrier 73 in the optical axis (the Z-axis) direction by the first actuator 10.

The housing 60 may have a shape of a rectangular box with open top and bottom, and may have an internal space.

The carrier 73 may be disposed in the internal space of the housing 60.

The case 630 may be coupled to the housing 60 to protect components of the second actuator 20.

The case 630 may include a protrusion 631 protruding toward a second ball member B2 to be described later. The protrusion 631 may serve as a stopper and a buffer member that regulates a movement range of the second ball member B2.

The second driving unit 800 may generate driving force in the optical axis (the Z-axis) direction to move the carrier 73 in the optical axis (the Z-axis) direction.

The second driving unit 800 may include a third magnet 810 and a third coil 830.

The third magnet 810 and the third coil 830 may be disposed to face each other in a direction perpendicular to the optical axis (the Z-axis).

The third magnet 810 may be disposed on the carrier 73. For example, the third magnet 810 may be disposed on one side of the carrier 73.

One side of the carrier 73 on which the third magnet 810 is disposed may protrude further in the optical axis (the Z-axis) direction than the other side of the carrier 73. For example, the carrier 73 may include a first guide portion 731 protruding in the optical axis (the Z-axis) direction on one side, and the third magnet 810 may be disposed on the first guide portion 731.

In this structure, since only the height of one side of the carrier 73 on which the third magnet 810 is disposed is formed to be long, the driving force of the second driving unit 800 may be improved and a height of the second actuator 20 in the optical axis (the Z-axis) direction may be reduced.

A back yoke may be disposed between the carrier 73 and the third magnet 810. The back yoke may improve the driving force by preventing leakage of magnetic flux of the third magnet 810.

The third magnet 810 may be magnetized so that one side and the other side have both the N pole and the S pole. For example, the third magnet 810 may be magnetized such that a surface facing the third coil 830 has an N pole, a neutral region, and an S pole sequentially in the optical axis (the Z-axis) direction. In addition, the third magnet 810 may be magnetized such that an opposite side facing the third coil 830 has an S pole, a neutral region, and an N pole sequentially in the optical axis (the Z-axis) direction.

The third coil 830 may be disposed on the housing 60 to face the third magnet 810. In detail, the third coil 830 is disposed on a substrate 890, and the substrate 890 may be mounted in the housing 60 so that the third magnet 810 and the third coil 830 face each other in a direction perpendicular to the optical axis (the Z-axis).

One side of the housing 60 may protrude further in the optical axis (the Z-axis) direction than the other side of the housing 60. For example, the housing 60 may include a second guide portion 633 protruding in the optical axis (the Z-axis) direction on one side, and the substrate 890 may be disposed on the second guide portion 633.

Also, the second guide portion 633 may have an accommodating space, and the first guide portion 731 may be accommodated in the accommodating space.

Through this structure, a height of the second actuator 20 in the optical axis (the Z-axis) direction may be reduced.

The third magnet 810 may be a movable member that is mounted on the carrier 73 and moves together with the carrier 73, and the third coil 830 may be a fixed member fixed to and mounted on the housing 60 through the substrate 890.

The second driving unit 800 may generate driving force in a direction perpendicular to a direction in which the third magnet 810 and the third coil 830 face each other, for example, the optical axis (the Z-axis) direction, by electromagnetic force formed between the third magnet 810 and the third coil 830 as power is applied to the third coil 830, and thus, the carrier 73 may be moved in the optical axis (the Z-axis) direction.

The second actuator 20 may detect a position of the carrier 73 in the optical axis (the Z-axis) direction. To this end, the second driving unit 800 may include a third position sensor 850. For example, the third position sensor 850 may be a hall sensor.

The third position sensor 850 may be mounted on the substrate 890 and disposed on the housing 60. The third position sensor 850 may be disposed inside the third coil 830 and may face the third magnet 810.

The second ball member B2 may be disposed between the carrier 73 and the housing 60. The second ball member B2 may be disposed between the first guide portion 731 of the carrier 73 and the second guide portion 633 of the housing 60.

The second ball member B2 may include a plurality of balls disposed in the optical axis (the Z-axis) direction. The plurality of balls may roll in the optical axis (the Z-axis) direction when the carrier 73 moves in the optical axis (the Z-axis) direction.

A yoke 870 may be disposed in the housing 60. The yoke 870 may be disposed on the housing 60 via the substrate 890. For example, the third coil 830 may be disposed on one surface of the substrate 890 and the yoke 870 may be disposed on the other surface of the substrate 890.

The yoke 870 may be disposed to face the third magnet 810. The yoke 870 and the third magnet 810 may generate an attractive force therebetween. For example, the yoke 870 and the third magnet 810 may generate an attractive force in a direction perpendicular to the optical axis (the Z-axis), in which the yoke 870 and the third magnet 810 face each other, and accordingly, the second ball member B2 may contact each of the carrier 73 and the housing 60.

The carrier 73 and the housing 60 may include guide recesses on surfaces facing each other. For example, a first guide portion 731 of the carrier 73 may include a third recess 731a, and a second guide portion 633 of the housing 60 may include a fourth recess 610.

The third recess 731a and the fourth recess 610 may extend in the optical axis (the Z-axis) direction, and the second ball member B2 may be disposed between the third recess 731a and the fourth recess 610.

In order to secure a space in which the first guide portion 731 of the carrier 73 and the second guide portion 633 of the housing 60 are disposed, an escape space may be provided in the fixed frame 100 and the movable frame of the first actuator 10.

As illustrated in FIG. 4, the fixed frame 100 has a structure including a step portion 151 on one side, and as illustrated in FIG. 12, one side of the movable frame 200 is formed to be shorter than the other side to expose a portion of the sensor substrate 400, and through this structure, an installation space of the first guide portion 731 and the second guide portion 633 may be secured.

Therefore, even if a portion of the carrier 73 and the housing 60 of the second actuator 20 protrudes in the optical axis (the Z-axis) direction, since the protrusion is disposed within the first actuator 10, the height of the camera module 1 in the optical axis (the Z-axis) direction may not increase.

Since the camera module 1 moves the relatively light image sensor S to perform OIS, OIS may be performed precisely. In addition, the camera module 1 may effectively dissipate heat generated by the image sensor S and the like.

The actuator for OIS and the camera module according to the various examples may have improved OIS performance and heat dissipation performance.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed to have a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An actuator for optical imaging stabilization (OIS), the actuator comprising:
    a fixed frame;
    a movable frame accommodated in the fixed frame and configured to move linearly and rotationally on a plane perpendicular to an optical axis;
    a driving unit disposed in the fixed frame and the movable frame and configured to provide driving force for moving the movable frame;
    a sensor substrate including a movable portion coupled to the movable frame and configured to move together with the movable frame, and a fixed portion coupled to the fixed frame; and
    an image sensor disposed on the sensor substrate,
    wherein the movable frame includes a reinforcing plate comprised of a material different from a material of the movable frame, and
    the reinforcing plate includes a bent portion bent in an optical axis direction toward the sensor substrate.

2. The actuator of claim 1, wherein the movable frame includes a protrusion protruding toward the sensor substrate on a lower surface thereof, and the bent portion is disposed on the protrusion.

3. The actuator of claim 2, wherein the movable portion of the sensor substrate is coupled to the protrusion of the movable frame.

4. The actuator of claim 1, wherein an air gap is formed in an optical axis direction between the movable frame and the sensor substrate.

5. The actuator of claim 1, wherein
    the driving unit includes:
    a magnet disposed on the movable frame; and
    a coil disposed on the fixed frame,
    wherein a ball member configured to guide movement of the movable frame is disposed between the movable frame and the fixed frame.

6. The actuator of claim 5, wherein the movable frame includes a plurality of recesses exposing the reinforcing plate in the optical axis direction.

7. The actuator of claim 5, wherein
    the reinforcing plate includes:
    a first region exposed through a recess and in which the magnet is disposed; and
    a second region exposed through the recess and in which the ball member is disposed.

8. The actuator of claim 7, wherein
    the first region is disposed outside the second region on a plane perpendicular to the optical axis, and
    the bent portion is disposed between the first region and the second region.

9. The actuator of claim 1, wherein the reinforcing plate comprises a material having higher thermal conductivity than a material of the movable frame.

10. The actuator of claim 1, wherein the reinforcing plate is comprised of a material having higher rigidity than a material of the movable frame.

11. The actuator of claim 1, wherein the reinforcing plate is integrally formed with the movable frame through insert injection.

12. The actuator of claim 1, wherein the movable frame is comprised of plastic, and the reinforcing plate is comprised of stainless steel.

13. An actuator for optical imaging stabilization (OIS), the actuator comprising:
    a fixed frame;
    a movable frame disposed to face the fixed frame in an optical axis direction and including a main body and a reinforcing plate comprised of a material different from a material of the main body;
    a sensor substrate disposed to face the movable frame in the optical axis direction; and
    an image sensor disposed on the sensor substrate,
    wherein
    the movable frame includes a first portion coupled to the sensor substrate in the optical axis direction and a second portion spaced apart from the sensor substrate in the optical axis direction, and
    a bent portion extending from the reinforcing plate in the optical axis direction is disposed in the first portion of the movable frame.

14. The actuator of claim 13, wherein
    an air gap is formed in the second portion of the movable frame, and
    with respect to the bent portion, the image sensor is disposed on a first side and the air gap is formed on a second side.

15. The actuator of claim 13, wherein the reinforcing plate is comprised of stainless steel.

16. A camera module including the actuator for OIS according to claim 13.

* * * * *